United States Patent
Brown et al.

(10) Patent No.: US 10,140,346 B2
(45) Date of Patent: Nov. 27, 2018

(54) SYSTEMS AND METHODS FOR INTEREST-DRIVEN BUSINESS INTELLIGENCE SYSTEMS INCLUDING GEO-SPATIAL DATA

(71) Applicant: Workday, Inc., Pleasanton, CA (US)

(72) Inventors: Hans-Frederick Brown, San Rafael, CA (US); James Mulholland, San Francisco, CA (US); Kevin Scott Beyer, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 465 days.

(21) Appl. No.: 14/313,191

(22) Filed: Jun. 24, 2014

(65) Prior Publication Data

US 2015/0081619 A1  Mar. 19, 2015

Related U.S. Application Data

(60) Provisional application No. 61/894,186, filed on Oct. 22, 2013, provisional application No. 61/880,051, filed on Sep. 19, 2013.

(51) Int. Cl.
G06F 17/30 (2006.01)

(52) U.S. Cl.
CPC .. G06F 17/30563 (2013.01); G06F 17/30241 (2013.01); G06F 17/30551 (2013.01); G06F 17/30592 (2013.01)

(58) Field of Classification Search
CPC ......... G06F 17/30241; G06F 17/30283; G06F 17/30306; G06F 17/30563; G06F 17/30551; G06F 17/30592

(Continued)

(56) References Cited

U.S. PATENT DOCUMENTS 6,112,197 A  8/2000 Chatterjee et al.
6,349,138 B1  2/2002 Doshi et al.
(Continued)

FOREIGN PATENT DOCUMENTS

EP  2040180 A1  3/2009
WO  2007072501 A2  6/2007
(Continued)

OTHER PUBLICATIONS

Extended European Search Report for European Application EP13754225.4,Report Completed May 4, 2015, Mailed May 13, 2015, 4 Pgs.

(Continued)

*Primary Examiner* — Jorge A Casanova
(74) *Attorney, Agent, or Firm* — Van Pelt, Yi & James LLP

(57) ABSTRACT

Systems and methods for interest-driven business intelligence systems including geo-spatial data in accordance with embodiments of the invention are illustrated. An interest-driven business intelligence system including raw data storage and perform extract, transform, and load processes, a data mart, and an intermediate processing layer, wherein the intermediate processing layer is configured to automatically generate metadata describing the raw data, derive reporting data requirements, and compile an interest-driven data pipeline based upon the reporting data requirements, where compiling the interest-driven data pipeline includes generating ETL processing jobs to generate geo-spatial data from the raw data, determining bounding data, bounding the filtered raw data based on the bounding data, generating geo-spatial data, and storing the geo-spatial data, generating reporting data including data satisfying the reporting data requirements based on the geo-spatial data, and storing the (Continued)

reporting data in the data mart for exploration by an interest-driven data visualization system.

21 Claims, 13 Drawing Sheets

(58) Field of Classification Search
USPC .................................. 707/602, 600, 610
See application file for complete search history.

(56) References Cited

U.S. PATENT DOCUMENTS

| | | | |
|---|---|---|---|
| 7,151,438 | B1 | 12/2006 | Hall et al. |
| 7,168,953 | B1 | 1/2007 | Poggio et al. |
| 7,209,923 | B1 | 4/2007 | Cooper |
| 7,272,660 | B1 | 9/2007 | Powers et al. |
| 7,275,053 | B1 | 9/2007 | Gardner et al. |
| 7,293,031 | B1 | 11/2007 | Dusker et al. |
| 7,299,216 | B1* | 11/2007 | Liang ................ G06F 11/0727 |
| 7,315,849 | B2 | 1/2008 | Bakalash et al. |
| 7,412,481 | B2 | 8/2008 | Nicholls |
| 7,430,562 | B1 | 9/2008 | Bedell et al. |
| 7,702,615 | B1 | 4/2010 | Delurgio et al. |
| 7,945,852 | B1 | 5/2011 | Pilskalns et al. |
| 8,032,485 | B2 | 10/2011 | Alvarez et al. |
| 8,156,101 | B2 | 4/2012 | Indeck et al. |
| 8,260,840 | B1 | 9/2012 | Sirota et al. |
| 8,261,193 | B1 | 9/2012 | Alur et al. |
| 8,266,148 | B2 | 9/2012 | Guha et al. |
| 8,447,721 | B2 | 5/2013 | Eshleman et al. |
| 2003/0030733 | A1 | 2/2003 | Seaman et al. |
| 2004/0059701 | A1 | 3/2004 | Fedorov |
| 2004/0138935 | A1 | 7/2004 | Johnson |
| 2004/0164961 | A1 | 8/2004 | Bal et al. |
| 2005/0187974 | A1 | 8/2005 | Gong et al. |
| 2006/0064667 | A1* | 3/2006 | Freitas ........................ G06F 8/35 717/104 |
| 2006/0100912 | A1* | 5/2006 | Kumar ............... G06F 17/30864 705/4 |
| 2006/0112123 | A1 | 5/2006 | Clark |
| 2006/0242604 | A1* | 10/2006 | Wong ............... G06F 17/30126 715/854 |
| 2007/0021992 | A1 | 1/2007 | Konakalla |
| 2007/0078960 | A1* | 4/2007 | Dawson ................ G06F 9/5072 709/223 |
| 2007/0136683 | A1* | 6/2007 | Heidari ................ G06F 9/4443 715/792 |
| 2007/0156718 | A1* | 7/2007 | Hossfeld ................ G06Q 90/00 |
| 2007/0239769 | A1* | 10/2007 | Fazal ............... G06F 17/30554 |
| 2007/0294126 | A1 | 12/2007 | Maggio |
| 2008/0046930 | A1 | 2/2008 | Smith |
| 2008/0109235 | A1 | 5/2008 | Binnie et al. |
| 2008/0253306 | A1* | 10/2008 | Manion ................ H04L 45/02 370/255 |
| 2008/0294996 | A1 | 11/2008 | Hunt |
| 2008/0313345 | A1* | 12/2008 | Bernardin ............... G06F 9/505 709/235 |
| 2009/0083306 | A1 | 3/2009 | Sichi |
| 2009/0248631 | A1 | 10/2009 | Alba et al. |
| 2009/0319544 | A1* | 12/2009 | Griffin .............. G06F 17/30557 |
| 2009/0319546 | A1* | 12/2009 | Shaik ................ G06F 17/30563 |
| 2010/0100952 | A1 | 4/2010 | Sample et al. |
| 2010/0251100 | A1 | 9/2010 | Delacourt |
| 2010/0287146 | A1 | 11/2010 | Skelton et al. |
| 2011/0004830 | A1 | 1/2011 | Von Kaenel et al. |
| 2011/0047525 | A1 | 2/2011 | Castellanos |
| 2011/0137850 | A1 | 6/2011 | Mourey et al. |
| 2011/0145287 | A1* | 6/2011 | Jiang ................ G06F 17/30905 707/780 |
| 2011/0282690 | A1 | 11/2011 | Patel et al. |
| 2011/0295794 | A1* | 12/2011 | Venkatasubramanian ................ G06F 17/30563 707/602 |
| 2011/0295795 | A1* | 12/2011 | Venkatasubramanian ................ G06F 17/30563 707/602 |
| 2011/0313969 | A1 | 12/2011 | Ramu |
| 2012/0109879 | A1* | 5/2012 | Devadoss ......... G06F 17/30563 707/602 |
| 2012/0130987 | A1 | 5/2012 | Bose et al. |
| 2012/0144243 | A1 | 6/2012 | Carey |
| 2012/0150791 | A1* | 6/2012 | Willson ............ G06F 17/30563 707/600 |
| 2012/0169713 | A1* | 7/2012 | Gao ................... G06Q 10/0637 345/419 |
| 2012/0179742 | A1 | 7/2012 | Acharya et al. |
| 2012/0239609 | A1 | 9/2012 | Zhao |
| 2012/0265726 | A1* | 10/2012 | Padmanabhan ....... G06F 17/303 707/602 |
| 2012/0324387 | A1* | 12/2012 | Rausch ............. G06F 17/30563 715/771 |
| 2013/0013552 | A1 | 1/2013 | Eshleman et al. |
| 2013/0018671 | A1 | 1/2013 | Hussam et al. |
| 2013/0086104 | A1 | 4/2013 | Morrison et al. |
| 2013/0103677 | A1 | 4/2013 | Chakra et al. |
| 2013/0132163 | A1* | 5/2013 | Eder ..................... G06Q 40/00 705/7.37 |
| 2013/0136416 | A1 | 5/2013 | Sathish et al. |
| 2013/0226860 | A1 | 8/2013 | Eshleman et al. |
| 2013/0238551 | A1 | 9/2013 | Eshleman et al. |
| 2014/0019352 | A1 | 1/2014 | Shrivastava |
| 2014/0114909 | A1 | 4/2014 | Schuster et al. |
| 2014/0114970 | A1 | 4/2014 | Prabu et al. |
| 2014/0149405 | A1 | 5/2014 | Dawson |
| 2014/0258209 | A1* | 9/2014 | Eshleman ......... G06F 17/30563 707/602 |
| 2015/0081353 | A1 | 3/2015 | Schuster et al. |
| 2015/0081618 | A1 | 3/2015 | Schuster et al. |
| 2015/0112969 | A1 | 4/2015 | Prabhu et al. |

FOREIGN PATENT DOCUMENTS

| | | | | |
|---|---|---|---|---|
| WO | | 2008092149 A2 | 7/2008 | |
| WO | WO | 2008092149 A2 * | 7/2008 | ............. G06Q 10/06 |
| WO | | 2013130870 A1 | 9/2013 | |
| WO | | 2014066051 A3 | 5/2014 | |
| WO | | 2014066052 A3 | 7/2014 | |
| WO | | 2014137413 A1 | 9/2014 | |
| WO | | 2015041714 A1 | 3/2015 | |
| WO | | 2015041731 A1 | 3/2015 | |
| WO | | 2015041735 A1 | 3/2015 | |
| WO | | 2015060892 A1 | 4/2015 | |
| WO | | 2015060893 A1 | 4/2015 | |

OTHER PUBLICATIONS

International Preliminary Report on Patentability for International Application PCT/US2013/064271, Report Issued Apr. 28, 2015, Mailed May 7, 2015, 9 Pgs.

International Preliminary Report on Patentability for International Application PCT/US2013/064272, Report Issued Apr. 28, 2015, Mailed May 7, 2015, 5 Pgs.

International Preliminary Report on Patentability for International Application PCT/US2013/067815, Report Issued Sep. 8, 2015, Mailed Sep. 17, 2015, 9 Pgs.

International Search Report and Written Opinion for International Application PCT/US13/64271, report completed Mar. 26, 2014, Mailed Apr. 18, 2014, 10 Pgs.

International Search Report and Written Opinion for International Application PCT/US13/64272, report completed Mar. 28, 2014, Mailed Apr. 21, 2014, 6 Pgs.

International Search Report and Written Opinion for International Application PCT/US2014/027875, report completed Jul. 15, 2014, Mailed Aug. 19, 2014, 9 Pages.

International Search Report and Written Opinion for International Application PCT/US14/42488, report completed Sep. 25, 2014, Mailed Oct. 30, 2014, 9 Pgs., Oct. 30, 2014.

(56) References Cited

OTHER PUBLICATIONS

Metwally, Ahmed et al., "Efficient Computation of Frequent and Top-k Elements in Data Streams", Department of Computer Science, University of California, Santa Barbara, 21 pgs.
International Preliminary Report on Patentability for International Application PCT/US2014/029149, Report issued Apr. 26, 2016, Mailed May 6, 2016, 9 Pgs.
International Preliminary Report on Patentability for International Application PCT/US2014/022060, Report issued Mar. 22, 2016, Mailed Mar. 31, 2016, 8 Pgs.
International Preliminary Report on Patentability for International Application PCT/US2014/029191, Report issued Apr. 26, 2016, Mailed May 6, 2016, 9 Pgs.
International Preliminary Report on Patentability for International Application PCT/US2014/042488, Report issued Mar. 22, 2016, Mailed Mar. 31, 2016, 8 Pgs.
International Preliminary Report on Patentability for International Application PCT/US2014/044050, Report issued Mar. 22, 2016, Mailed Mar. 31, 2016, 6 Pgs.
International Search Report and Written Opinion for International Application PCT /US14/22060, report completed Jun. 23, 2014 Mailed Jul. 21, 2014, 9 Pgs.
International Search Report and Written Opinion for International Application PCT/US14/29149, report completed Jul. 22, 2014, Mailed Aug. 25, 2014, 9 Pages.
International Search Report and Written Opinion for International Application PCT/US14/29191, report completed Jun. 30, 2014, Mailed Aug 15, 2014, 9 Pages.
International Search Report and Written Opinion for International Application PCT/US14/44050, report completed Oct. 3, 2014, Mailed Oct. 15, 2014, 7 Pgs., Oct. 15, 2014.
International Preliminary Report on Patentability for International Application PCT/US2013/028402, report completed Apr. 23, 2013, Mailed Sep. 12, 2014, 6 Pgs., Sep. 12, 2014.
Karabegovic, Almir et al., "Geoportal as Decision Support System with Spatial Data Warehouse", [online] published 2012. [retrieved on Oct. 3, 2014 (Oct. 3, 2014)] Retrieved from the Internet<URL: https://fedcsis.org/proceedings/2012/pliks/111.pdf> entire document, 2012, 4 Pages.
International Search Report and Written Opinion for International Application PCT/US2013/028402, completed Apr. 22, 2013, 7 pgs.
International Search Report and Written Opinion for International Application PCT/US13/067815, completed Apr. 14, 2014, 11 pgs.
Borthakur et al., "Apache Hadoop Goes Realtime at Facebook", SIGMOD '11 Proceedings of the 2011 ACM SIGMOD International Conference on Management of data, 1071-1080.
Cohen et al., "MAD Skills: New Analysis Practices for Big Data", Proceedings of the VLDB Endowment, vol. 2 Issue 2, Aug. 2009, 1481-1492.
Condie et al., "MapReduce Online", Available online at http://www.eecs.berkeley.edu/Pubs/TechRpts/2009/EECS-2009-136.html, 1-15.
Kossmann, "The State of the Art in Distributed Query Processing", ACM Computing Surveys, vol. 32 Issue 4, Dec. 2000, Dec. 2000, 422-469.
Morfonios et al., "ROLAP Implementations of the Data Cube", ACM Computing Surveys, vol. 39, No. 4, Article 12, 2007, Oct. 2007, 12:1-12:53.
Nandi et al., "Guided Interaction: Rethinking the Query-Result Paradigm", Proceedings of the VLDB Endowment, vol. 4, No. 12, Aug. 2011, 1466-1469.
Shvachko, Konstantin et al., "The Hadoop Distributed File System", 2010 IEEE 26th Symposium on Mass Storage Systems and Technologies (MSST), 1-10.

\* cited by examiner

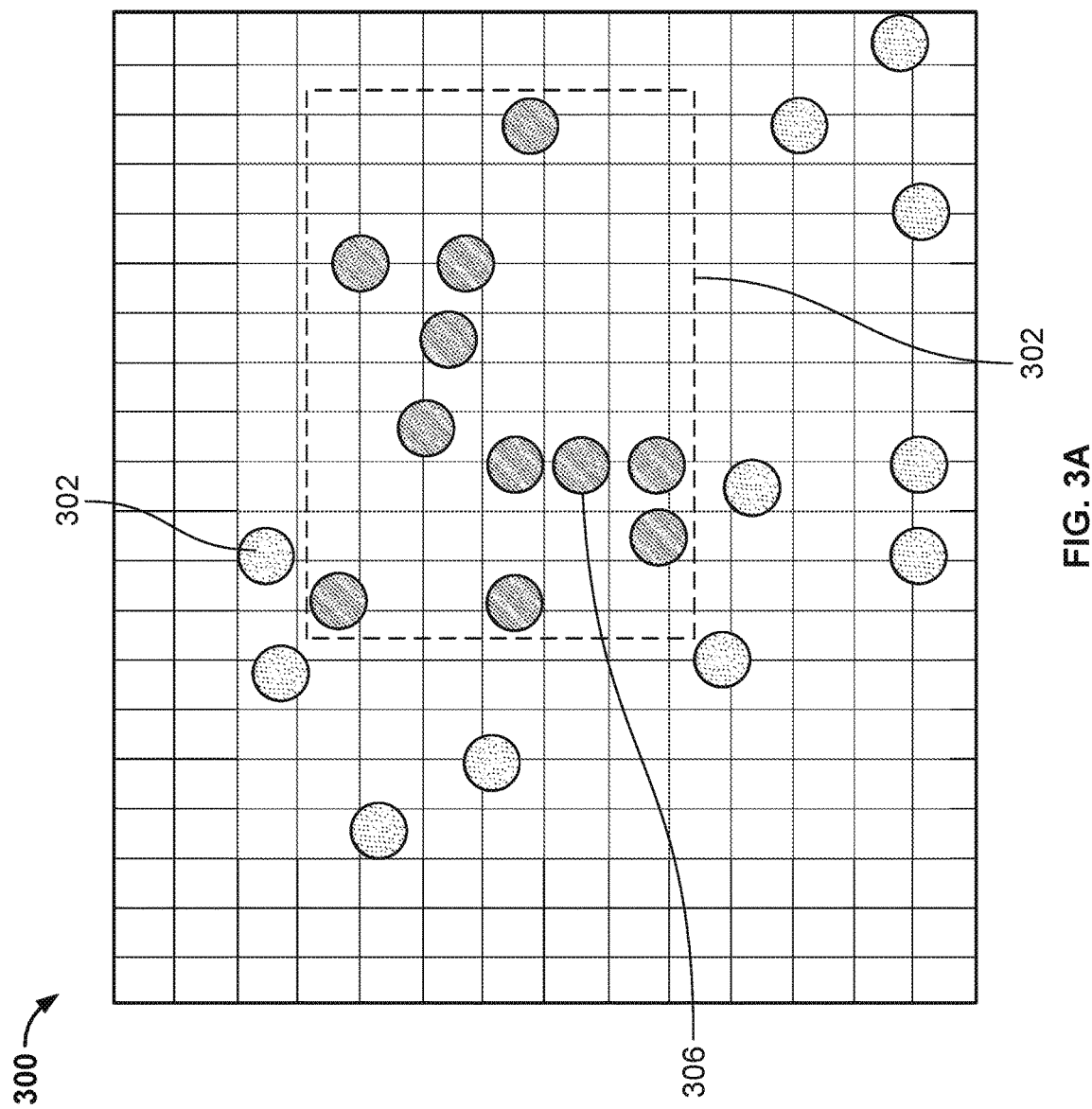

SYSTEMS AND METHODS FOR INTEREST-DRIVEN BUSINESS INTELLIGENCE SYSTEMS INCLUDING GEO-SPATIAL DATA

CROSS-REFERENCE TO RELATED APPLICATIONS

The current application claims priority to U.S. Provisional Patent Application Ser. No. 61/894,186, filed Oct. 22, 2013, and to U.S. Provisional Patent Application Ser. No. 61/880,051, filed Sep. 19, 2013, the disclosures of which are hereby incorporated by reference in their entirety.

FIELD OF THE INVENTION

The present invention is generally related to business intelligence systems and more specifically business intelligence systems with geographic data.

BACKGROUND

The term "business intelligence" is commonly used to refer to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and/or utilize a data warehouse.

Data warehouses are utilized to store, analyze, and report data such as business data. Data warehouses utilize databases to store, analyze, and harness the data in a productive and cost-effective manner. A variety of databases are commonly utilized including a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators and/or business intelligence specialists, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema that looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP) is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for many OLAP systems is an OLAP cube. An OLAP cube is a data structure allowing for fast analysis of data with the capability of manipulating and analyzing data from multiple perspectives. OLAP cubes are typically composed of numeric facts, called measures, categorized by dimensions. These facts and measures are commonly created from a star schema or a snowflake schema of tables in a RDBMS.

SUMMARY OF THE INVENTION

Systems and methods for interest-driven business intelligence systems including geo-spatial data in accordance with embodiments of the invention are illustrated. An interest-driven business intelligence system including raw data storage configured to contain raw data and perform extract, transform, and load (ETL) processes, a data mart configured to contain metadata that describes the raw data, and an intermediate processing layer, wherein the intermediate processing layer is configured to automatically generate metadata describing the raw data, derive reporting data requirements from at least one report specification based on the metadata, and compile an interest-driven data pipeline based upon the reporting data requirements, where compiling the interest-driven data pipeline includes generating ETL processing jobs to generate geo-spatial data from the raw data by filtering the raw data based on the metadata describing the raw data, determining bounding data based on the metadata describing the raw data, bounding the filtered raw data based on the bounding data, generating geo-spatial data based on the bounded filtered raw data, and storing the geo-spatial data in the data mart, generating reporting data including data satisfying the reporting data requirements based on the geo-spatial data, and storing the reporting data in the data mart for exploration by an interest-driven data visualization system.

In an additional embodiment of the invention, the raw data includes unstructured data.

In another embodiment of the invention, the raw data storage is a data warehouse.

In yet another additional embodiment of the invention, the data warehouse is implemented utilizing a system selected from the group consisting of a distributed computing system, a database management system, and a NoSQL database.

In still another additional embodiment of the invention, the data warehouse is a distributed computing system implemented utilizing Hadoop.

In yet still another additional embodiment of the invention, the data warehouse is configured to store data generated utilizing the intermediate processing layer.

In yet another embodiment of the invention, the intermediate processing layer is configured to generate data warehouse requests.

In still another embodiment of the invention, the data warehouse requests include MapReduce operations.

In yet still another embodiment of the invention, the intermediate processing layer is implemented utilizing a system selected from the group consisting of a distributed computing system, a database management system, and a NoSQL database system.

In yet another additional embodiment of the invention, the system further includes an interest-driven data visualization system wherein the interest-driven data visualization system is configured to receive metadata describing the raw data from the intermediate processing layer and generate a user interface enabling user exploration of the metadata to define at least one report specification, where the user exploration involves selection of additional reporting data based on the metadata.

In still another additional embodiment of the invention, the interest-driven data visualization system is configured to display an indication based upon the interactive exploration of the at least one report.

In yet still another additional embodiment of the invention, the data mart is further configured to contain aggregate data, where aggregate data includes structured data generated using ETL processes from the raw data.

In yet another embodiment of the invention, compiling the interest-driven pipeline further includes generating ETL processing jobs to generate aggregate data from the raw data by filtering the raw data based on the metadata describing the raw data, applying transformations to the raw data based on the metadata describing the raw data, generating aggregate data based on the transformed data, and storing the aggregate data in the data mart.

In still another embodiment of the invention, compiling the interest-driven pipeline further includes generating ETL processing jobs to generate aggregate data from geo-spatial data by identifying at least one dimension within a piece of geo-spatial data, obtaining raw data corresponding to the identified at least one dimension, applying transformations to the obtained raw data based on the metadata describing the obtained raw data, generating aggregate data based on the transformed data, and storing the aggregate data in the data mart.

In yet still another embodiment of the invention, compiling the interest-driven pipeline further includes generating ETL processing jobs to generate geo-spatial data from aggregate data by identifying at least one dimension within a piece of aggregate data, obtaining raw data corresponding to the identified at least one dimension, filtering the obtained raw data based on the metadata describing the obtained raw data, determining bounding data based on the metadata describing the obtained raw data, bounding the filtered obtained raw data based on the bounding data, generating geo-spatial data based on the bounded data, and storing the geo-spatial data in the data mart.

In yet another additional embodiment of the invention, the data mart is contained within the intermediate processing layer.

In still another additional embodiment of the invention, the bounding data includes at least one dimension identified in the metadata describing the raw data.

In yet still another additional embodiment of the invention, bounding the filtered raw data based on the bounding data includes determining pieces of raw data that identifying a location that is within the location described by the bounding data.

In yet another embodiment of the invention, bounding the filtered raw data based on the bounding data further includes mapping at least two dimensions within the filtered raw data to a common set of data and the common set of data is based on the bounding data.

In still another embodiment of the invention, the bounding data includes a latitude and a longitude.

In yet still another embodiment of the invention, the bounding data includes a location.

In yet another additional embodiment of the invention, the bounding data includes a bounding region described relative to the location.

Still another embodiment of the invention includes a method for creating a report utilizing an interest-driven business intelligence system including storing raw data in raw data storage using an interest-driven business intelligence system, where the raw data includes unstructured data, generating metadata describing the raw data using the interest-driven business intelligence system, receiving report definitions generated utilizing the metadata describing the raw data using the interest-driven business intelligence system, automatically generating reporting data requirements derived from report definitions using the interest-driven business intelligence system, automatically compiling an interest-driven data pipeline that is part of the interest-driven business intelligence system using the reporting data requirements and the raw data, obtaining geo-spatial data from the interest-driven data pipeline based on the generated reporting data requirements using the interest-driven business intelligence system, where the geo-spatial data includes a set of dimensions and the geo-spatial data is bounded based on at least one dimension in the set of dimensions, generating reporting data from the reporting data requirements using the interest-driven data pipeline, where the reporting data is based on a portion of the geo-spatial data, and storing the generated reporting data in a data mart within the interest-driven business intelligence system.

BRIEF DESCRIPTION OF THE DRAWINGS

FIG. 3A is a conceptual illustration of a piece of geo-spatial data that can be utilized in an interest-driven business intelligence system in accordance with an embodiment of the invention.

DETAILED DISCLOSURE OF THE INVENTION

Figure 1:
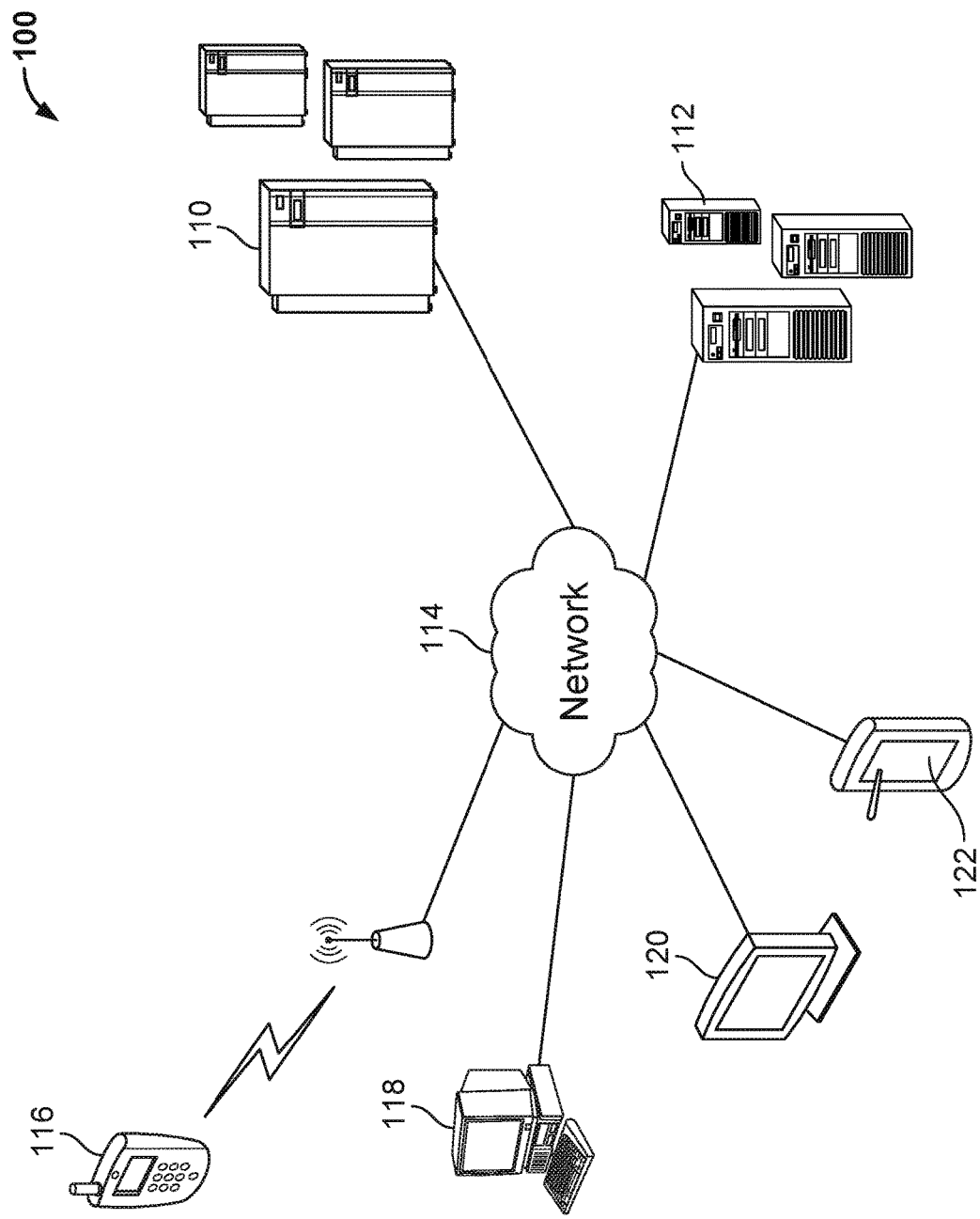
FIG. 1 is a network diagram of an interest-driven business intelligence system in accordance with an embodiment of the invention.

Turning now to the drawings, interest-driven business intelligence systems configured to utilize geo-spatial data in accordance with embodiments of the invention are illustrated. Interest-driven business intelligence systems include interest-driven business intelligence server systems configured to create reporting data using raw data retrieved from distributed computing platforms. The interest-driven business intelligence server systems are configured to dynamically compile interest-driven data pipelines to provide analysts with information of interest from the distributed computing platform. The interest-driven business intelligence server system has the ability to dynamically reconfigure the interest-driven data pipeline to provide access to desired information stored in the distributed computing platform. An interest-driven data pipeline is dynamically compiled to create reporting data based on reporting data requirements determined by analysts within the interest-driven business intelligence system. Changes specified at the report level can be automatically compiled and traced backward by the interest-driven business intelligence server system to compile an appropriate interest-driven data pipeline to meet the new and/or updated reporting data requirements. Interest-driven business intelligence server systems further build metadata concerning the data available in the interest-driven business intelligence system and provide the metadata to interest-driven data visualization systems to enable the construction of reports using the metadata. In this way, interest-driven business intelligence server systems are capable of managing huge datasets in a way that provides analysts with complete visibility into the available data. Available data within an interest-driven business intelligence system includes, but is not limited to, raw data, aggregate data, filtered data, and reporting data. Interest-driven business intelligence systems and interest-driven business intelligence server systems that can be utilized in accordance with embodiments of the invention are discussed further in U.S. Pat. No. 8,447,721, titled "Interest-Driven Business Intelligence Systems and Methods of Data Analysis Using Interest-Driven Data Pipelines" and issued May 21, 2013, the entirety of which is incorporated herein by reference.

In many embodiments, the reports are created using interest-driven data visualization systems configured to request and receive data from an interest-driven business intelligence server system. Systems and methods for interest-driven data visualization that can be utilized in accordance with embodiments are described in U.S. patent application Ser. No. 13/791,028, titled "Systems and Methods for Interest-Driven Data Visualization Systems Utilized in Interest-Driven Business Intelligence Systems" and filed Mar. 8, 2013, the entirety of which is hereby incorporated by reference. In order for an interest-driven data visualization system to build reports, a set of reporting data requirements are defined. These requirements specify the reporting data (derived from raw data) that will be utilized to generate the reports. The raw data can be structured, semi-structured, or unstructured. In a variety of embodiments, structured and semi-structured data include metadata, such as an index or other relationships, describing the data; unstructured data lacks any definitional structure. An interest-driven business intelligence server system can utilize reporting data already created by the interest-driven business intelligence server systems and/or cause new and/or updated reporting data to be generated to satisfy the reporting data requirements. In a variety of embodiments, reporting data requirements are obtained from interest-driven data visualization systems based on reporting requirements defined by analysts exploring metadata describing raw data stored in the interest-driven business intelligence system. In many embodiments, reports utilized in interest-driven data visualization systems include a set of datasets determined using reporting data received from an interest-driven business intelligence server system and a set of visualizations. Interest-driven data visualization systems are configured to enable the dynamic association of datasets to visualizations to provide a variety of interactive reports describing the data. In a number of embodiments, multiple datasets within a piece of reporting data (or multiple pieces of reporting data) can be visualized within a single visualization by utilizing a trellised visualization. A trellised visualization includes a plurality of visualizations. In several embodiments, at least one of these visualizations is designated as the master visualization and zero or more slave visualizations can be associated with the master visualization(s). Based on the relationships between the master visualizations and the slave visualizations, interactions with the master visualization(s) are mapped to the slave visualizations. In this way, the slave visualizations can be interacted with in concert with the corresponding master visualizations. Each of the visualizations within the trellised visualization is displayed simultaneously by the interest-driven data visualization system. Systems and methods for interest-driven data visualizations configured to generate trellised visualizations that can be utilized in accordance with embodiments of the invention are disclosed in U.S. patent application Ser. No. 14/140,211, titled "Systems and Methods for Interest-Driven Data Visualization Systems Utilizing Visualization Image Data and Trellised Visualizations" and filed Dec. 24, 2013, the entirety of which is hereby incorporated by reference.

Interest-driven business intelligence server systems are configured to provide reporting data based on one or more reporting data requirements. Reporting data provided by interest-driven business intelligence server systems includes raw data, aggregate data, event-oriented data, geo-spatial data, and/or filtered (e.g. projected) data loaded from raw data storage that has been processed and loaded into a data structure to provide rapid access to the data. It should be noted that any transformation of data loaded from raw data storage can be utilized as appropriate to the requirements of specific embodiments of the invention. In several embodiments, reporting data derived from aggregate data is referred to as aggregate reporting data; similarly, reporting data derived from geo-spatial data can be referred to as geo-spatial reporting data. Event-oriented data includes sets of data aligned along one or more of the dimensions of (e.g. columns of data within) the sets of data. Sets of data include, but are not limited to, fact tables and dimension tables as appropriate to the requirements of specific applications in accordance with embodiments of the invention. In this way, event-oriented data can include a variety of data across multiple sets of data that are organized by ordering data. Systems and methods for business intelligence systems including event-oriented data that can be utilized in accordance with embodiments of the invention are described in U.S. patent application Ser. No. 14/198,039, titled "Systems and Methods for Interest-Driven Business Intelligence Systems Including Event-Oriented Data" and filed Mar. 5, 2014, the entirety of which is hereby incorporated by reference.

Business intelligence systems, including interest-driven business intelligence systems in accordance with embodiments of the invention can be configured to provide segment data that can be explored using interest-driven data visualization systems. In a variety of embodiments, segment data includes data grouped by one or more pieces of segment grouping data. This segment grouping data can be utilized in the exploration of the segment data to quickly identify patterns of interest within the data. The data utilized within the segment data can be sourced from a variety of pieces of data, including source data, aggregate data, event-oriented data, geo-spatial data, and reporting data as appropriate to the requirements of specific applications in accordance with embodiments of the invention. Additionally, multiple segments can be combined together in order to explore patterns existing across multiple segments for one or more pieces of reporting data. Based on patterns identified within the (combined) segment data, specific pieces of reporting data can be generated targeting the identified patterns within the segment data. This reporting data can then be utilized to generate detailed reports for additional analysis and exploration of the patterns located within the (combined) segment data. In a variety of embodiments, metadata describing the (combined) segment data can be stored and utilized to generate updated segment data. This updated segment data can be utilized to further analyze patterns occurring within the reporting data as the underlying reporting data changes. Systems and methods for interest-driven business intelligence systems configured to utilize segment data that can be utilized in accordance with embodiments of the invention are described in U.S. patent application Ser. No. 14/197,150, titled "Systems and Methods for Interest-Driven Business Intelligence Systems including Segment Data" and filed Mar. 5, 2014, the entirety of which is hereby incorporated by reference.

In a number of embodiments, the raw data, aggregate data, event-oriented data, geo-spatial data, and/or filtered data is provided to interest-driven business intelligence server systems as source data. In many embodiments, the source data is described by metadata describing the raw data, aggregate data, event-oriented data, geo-spatial data, and/or filtered data present in the source data. In several embodiments, the source data, aggregate data, event-oriented data, geo-spatial data, and/or reporting data is stored in a data mart or other aggregate data storage associated with the interest-driven business intelligence server system. Interest-driven business intelligence server systems can load source data into a variety of reporting data structures in accordance with a number of embodiments, including, but not limited to, online analytical processing (OLAP) cubes. In a variety of embodiments, the reporting data structures are defined using reporting data metadata describing a reporting data schema. In a number of embodiments, interest-driven business intelligence server systems are configured to combine requests for one or more OLAP cubes into a single request, thereby reducing the time, storage, and/or processing power utilized by the interest-driven business intelligence system in creating source data utilized to create reporting data schemas and/or the reporting data.

In many embodiments, geo-spatial data reporting data is visualized and explored using interest-driven data visualization systems to analyze trends within the regions identified within the geo-spatial data reporting data. In several embodiments, these regions are based on boundary data that defines a particular region within the reporting data. In a number of embodiments, these regions are based on binning data that approximates a region within the reporting data defined based on boundary data. Based on the data associated with the analyzed regions, reporting data requirements identifying aggregate data can be used to create jobs and generate the aggregate data corresponding to the analyzed trends. The aggregate data can then be utilized to generate aggregate reporting data that can be analyzed to gain deeper insights into the regions identified within the geo-spatial data. Similarly, aggregate reporting data can be analyzed to identify potential regions of interest that form the basis for jobs to generate geo-spatial data describing the regions. The geo-spatial data can then be utilized to generate geo-spatial reporting data utilized by interest-driven data visualization systems to analyze the regions identified within the geo-spatial reporting data. For example, the users of a video-on-demand service can have their viewing activity aggregated by the geographic region in which the users live. Based on this geographic data, the relative popularity of particular videos can be quickly analyzed to identify what videos are popular in what areas. This information can then be utilized in a variety of ways, such as providing insights regarding other videos that may be popular in one geographic region but less popular in another. In this way, particular phenomenon within the reporting data based on the geographical distribution of the reporting data can be identified.

Systems and methods for interest-driven business intelligence systems including geo-spatial data in accordance with embodiments of the invention are described below. Although many of the techniques described below are in reference to particular pieces of data being within or outside of a particular bounding area, it should be noted that bins (e.g. aggregations) of data, where a portion of the binned data is within the bounding area and a portion of the binned data is outside of the bounding area, can be included or excluded in a particular bounding area as appropriate to the requirements of specific applications in accordance with embodiments of the invention.

Interest-Driven Business Intelligence System Overview

An interest-driven business intelligence system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven business intelligence server system 112 via a network 114. In several embodiments of the invention, the network 114 is a local area network, a wide area network, or the Internet; however, any network 114 can be utilized as appropriate to the requirements of specific applications in accordance with embodiments of the invention.

In a variety of embodiments, the distributed computing platform 110 is a cluster of computing devices configured as a distributed computing platform. The distributed computing platform 110 can be configured to act as a raw data storage system and a data warehouse within the interest-driven business intelligence system. In a number of embodiments, the distributed computing platform includes a distributed file system configured to distribute the data stored within the distributed computing platform 110 across the cluster computing devices. In many embodiments, the distributed data is replicated across the computing devices within the distributed computing platform, thereby providing redundant storage of the data. The distributed computing platform 110 is configured to retrieve data from the computing devices by identifying one or more of the computing devices containing the requested data and retrieving some or all of the data from the computing devices. In a variety of embodiments where portions of a request for data are stored using different computing devices, the distributed computing platform 110 is configured to process the portions of data received from the computing devices in order to build the data obtained in response to the request for data. Any distributed file system, such as the Hadoop Distributed File System (HDFS), can be utilized as appropriate to the requirements of specific applications in accordance with embodiments of the invention.

In several embodiments, the interest-driven business intelligence server system 112 is implemented using one or a cluster of computing devices. In a variety of embodiments, alternative distributed processing systems are utilized. Raw data storage is utilized to store raw data, metadata storage is utilized to store data description metadata describing the raw data, and/or report storage is utilized to store previously generated reports including previous reporting data and previous reporting data requirements. Raw data storage, metadata storage, and/or report storage can be a portion of the memory associated with the interest-driven business intelligence server system 112, the distributed computing platform 110, and/or a separate device in accordance with the specific requirements of specific embodiments of the invention. In a variety of embodiments, the interest-driven business intelligence server system 112 and/or distributed computing platform 110 is configured to generate an index for the raw data, metadata, and/or reporting data as appropriate to the requirements of specific applications of the invention. In several embodiments, the interest-driven business intelligence server system 112 and/or distributed computing platform 110 is configured to access data directly without generating and/or referencing an index.

The interest-driven business intelligence server system 112 is configured to communicate via the network 114 with one or more interest-driven data visualization systems, including, but not limited to, mobile devices 116, personal computers 118, presentation devices 120, and tablet devices 122. In many embodiments of the invention, interest-driven data visualization systems include any computing device capable of receiving and/or displaying data. Interest-driven data visualization systems allow users to specify reports including data visualizations that enable the user to explore the raw data stored within the distributed computing platform 110 using reporting data generated by the interest-driven business intelligence server system 112. Reporting data is provided in a variety of forms, including, but not limited to, snowflake schemas and star schemas as appropriate to the requirements of specific applications in accordance with embodiments of the invention. In many embodiments, reporting data is any data that includes fields of data populated using raw data stored within the distributed computing platform 110. The reporting data requested can include aggregate reporting data, event-oriented reporting data, and/or geo-spatial reporting data as appropriate to the requirements of specific applications in accordance with embodiments of the invention.

Based on received reporting data requirements, the interest-driven business intelligence server system 112 automatically compiles one or more interest-driven data pipelines to create or update reporting data to satisfy the received reporting data requirements. The interest-driven business intelligence server system 112 is configured to compile one or more interest-driven data pipelines configured to create and push down jobs to the distributed computing platform 110 to create source data and then applying various filtering, aggregation, alignment, bounding, and/or grouping processes to the source data to produce reporting data to be transmitted to interest-driven data visualization systems. In a number of embodiments, a bounding process includes identifying bounding data based on one or more dimensions across a plurality of pieces of source data and creating geo-spatial data including data taken from the plurality of pieces of source data bounded by the bounding data. In a variety of embodiments, the dimensions and the bounding data are stored using geo-spatial data metadata describing the structure (e.g. a schema) of the geo-spatial data. The fact data corresponding to the geo-spatial data can be combined with the geo-spatial data metadata in response to the received reporting data requirements as appropriate to the requirements of specific applications in accordance with embodiments of the invention.

In many embodiments, the interest-driven business intelligence server system 112 includes reporting data, source data, event-oriented data, geo-spatial data, and/or aggregate data that partially or fully satisfy the reporting data requirements. The interest-driven business intelligence server system 112 is configured to identify the relevant existing reporting data, aggregate data, event-oriented data, geo-spatial data, and/or source data and configure an interest-driven data pipeline to create jobs requesting reporting data minimizing the redundancy between the existing data and the new reporting data requirements. In a variety of embodiments, the interest-driven business intelligence server system 112 is configured to determine redundancies between the requested data and existing data using metadata describing the data available from the distributed computing platform 110. In a number of embodiments, the metadata further describes what form the data is available in, such as, but not limited to, aggregate data, filtered data, source data, reporting data, event-oriented data, and geo-spatial data. In several embodiments, the interest-driven business intelligence server system 112 obtains a plurality of reporting data requirements and creates jobs using the interest-driven data pipeline to create source data containing data fulfilling the union of the plurality of reporting data requirements. In a variety of embodiments, the interest-driven business intelligence server system 112 is configured to identify redundant data requirements in one or more reporting data requirements and configure an interest-driven data pipeline to create jobs requesting source data fulfilling the redundant data requirements. In several embodiments, the interest-driven business intelligence server system 112 is configured to store aggregate data, event-oriented data, geo-spatial data, and/or reporting data in a data mart and utilize the stored data to identify the redundant data requirements. In a number of embodiments, the interest-driven business intelligence server system 112 is configured to identify when reporting data requirements request updated data for existing reporting data and/or source data and configure an interest-driven data pipeline to create jobs to retrieve an updated snapshot of the existing reporting data from the distributed computing platform 110.

The interest-driven business intelligence server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metrics collected based on the performance of previously executed jobs.

In several embodiments, jobs pushed down to the distributed computing platform 110 by the interest-driven business intelligence server system 112 cannot be executed in a low-latency fashion. In many embodiments, the distributed computing platform 110 is configured to provide a partial set of source data fulfilling the pushed down job and the interest-driven business intelligence server system 112 is configured to create reporting data using the partial set of source data. As more source data is provided by the distributed computing platform 110, the interest-driven business intelligence server system 112 is configured to update the created reporting data based on the received source data. In a number of embodiments, the interest-driven business intelligence server system will continue to update the reporting data until a termination condition is reached. Termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based on the time previously measured in the retrieval of source data for similar reporting data requirements.

Although a specific architecture for an interest-driven business intelligence system in accordance with an embodiment of the invention is conceptually illustrated in FIG. 1, any of a variety of architectures configured to store large data sets and to automatically build interest-driven data pipelines based on reporting data requirements can also be utilized. Systems and methods for interest-driven business intelligence server systems and geo-spatial data in accordance with embodiments of the invention are discussed in detail below.

Interest-Driven Business Intelligence Server Systems

Interest-driven business intelligence server systems in accordance with embodiments of the invention are configured to create jobs to request source data from interest-driven business intelligence systems based on received reporting data requirements and to create reporting data using the received source data. The reporting data can be aggregate reporting data event-oriented reporting data, and/or geo-spatial reporting data based on the received reporting data requirements. It should be noted that any data derived from the source data can be utilized as reporting data as appropriate to the requirements of specific embodiments of the invention.

Figure 2:
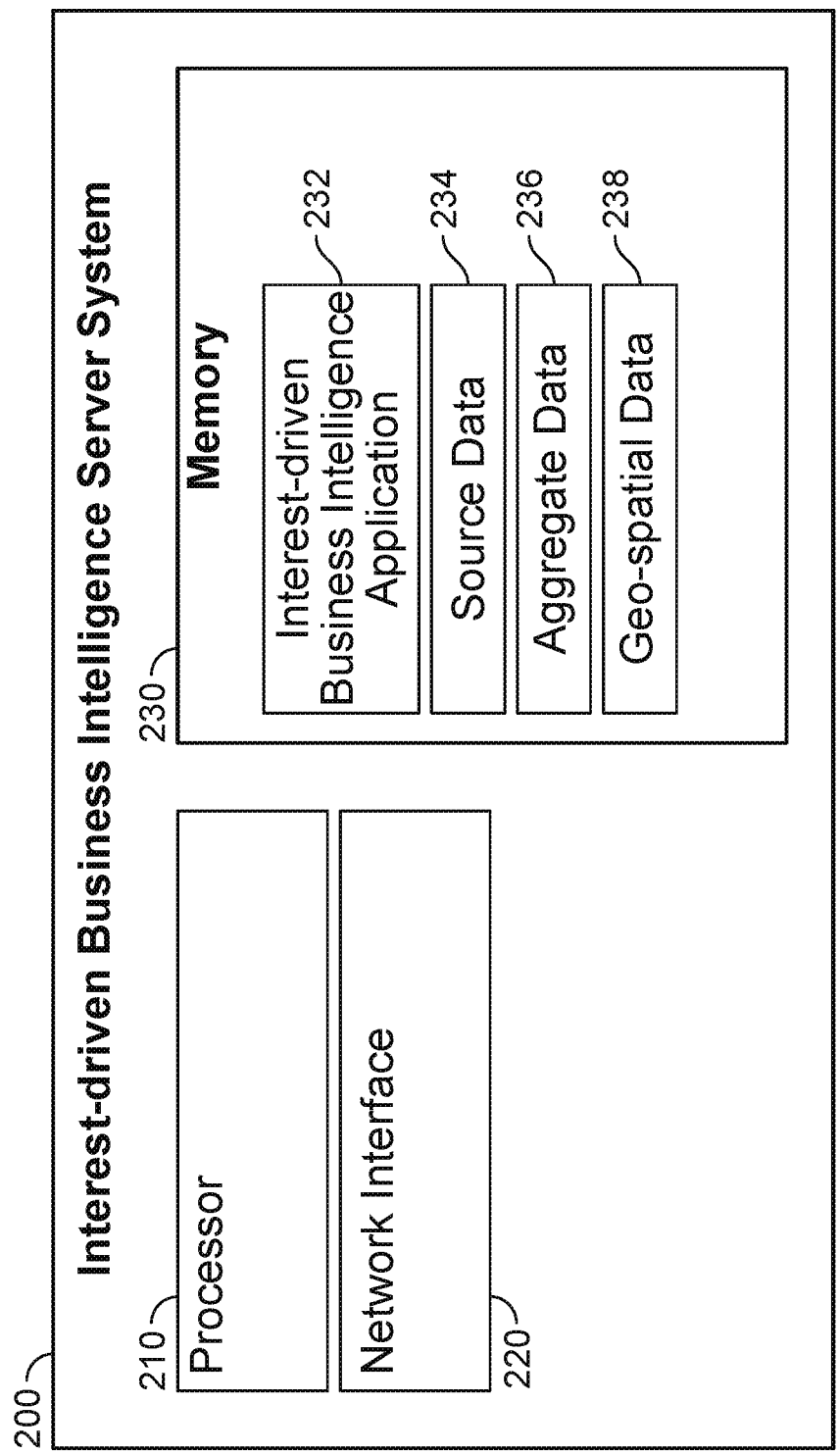
FIG. 2 is a conceptual illustration of an interest-driven business intelligence server system in accordance with an embodiment of the invention.

An interest-driven business intelligence server system in accordance with an embodiment of the invention is conceptually illustrated in FIG. 2. The interest-driven business intelligence server system 200 includes a processor 210 in communication with memory 230. The memory 230 is any form of storage configured to store a variety of data, including, but not limited to, an interest-driven business intelligence application 232, source data 234, aggregate data 236, and geo-spatial data 238. The interest-driven business intelligence server system 200 also includes a network interface 220 configured to transmit and receive data over a network connection. In a number of embodiments, the network interface 220 is in communication with the processor 210 and/or the memory 230. In many embodiments, the interest-driven business intelligence application 232, source data 234, aggregate data 236, and/or geo-spatial data 238 are stored using an external server system and received by the interest-driven business intelligence server system 200 using the network interface 220. External server systems in accordance with a variety of embodiments include, but are not limited to, distributed computing platforms and data marts. In several embodiments, the aggregate data 236 and/or geo-spatial data 238 are stored in a dictionary-encoded format. In a number of embodiments, the aggregate data 236 and/or geo-spatial data 238 is stored using run length encoding and/or a sparse representation. It should be noted, however, that any encoding format could be utilized as appropriate to the requirements of specific applications in accordance with embodiments of the invention. In a variety of embodiments, the aggregate data 236 and/or geo-spatial data 238 is stored as parallel arrays of data with each array representing the values of a particular field of data.

The interest-driven business intelligence application 232 configures the processor 210 to perform an interest-driven business intelligence process. In many embodiments, an interest-driven business intelligence process includes creating jobs using an interest-driven data pipeline to retrieve source data in response to reporting data requirements. The source data can then be utilized to generate aggregate data, event-oriented data, and/or geo-spatial data as appropriate to the requirements of specific applications in accordance with embodiments of the invention. In a variety of embodiments, the created jobs are based on redundancies between reporting data requirements and existing source data 234, aggregate data 236, and/or geo-spatial data 238. In a number of embodiments, the interest-driven business intelligence process includes updating reporting data based on incrementally received source data and/or updated source data. In several embodiments, the interest-driven business intelligence process includes obtaining a request for aggregate reporting data and generating the aggregate reporting data based on one or pieces of geo-spatial data. Similarly, the interest-driven business intelligence process can also include obtaining a request for geo-spatial reporting data and generating the geo-spatial reporting data based on one or pieces of aggregate data.

Although a specific architecture for an interest-driven business intelligence server system in accordance with an embodiment of the invention is conceptually illustrated in FIG. 2, any of a variety of architectures, including those that store data or applications on disk or some other form of storage and are loaded into memory at runtime, can also be utilized. Additionally, it should be noted that while processes are describe with respect to generating aggregate reporting data based on geo-spatial data and vice-versa, geo-spatial reporting data can be generated based on event-oriented data and vice-versa utilizing processes similar to those described herein as appropriate to the requirements of specific applications in accordance with embodiments of the invention. Processes for obtaining and generating aggregate data and geo-spatial data in accordance with embodiments of the invention are discussed further below.

Geo-Spatial Data

In several embodiments, geo-spatial data, event-oriented data, and aggregate data can both be constructed based on a number of facts and dimensions within a particular data schema. In interest-driven business intelligence systems, the data schema can describe source data, aggregate data, event-oriented data, geo-spatial data, and/or reporting data. Other data, including metadata describing raw data available from distributed computing platform, can also be utilized within the data schema to aid in the definition and population of aggregate data, event-oriented data, and/or geo-spatial data as appropriate to the requirements of specific applications in accordance with embodiments of the invention.

Turning now to FIG. 3A, a conceptual illustration of geo-spatial data in accordance with an embodiment of the invention is shown. The geo-spatial data 300 includes a set of data 302, a bounding area 302, and a set of included data 306. While the illustrated embodiment, includes a rectangular bounding area, it should be noted that any bounding area, including arbitrary shapes, irregular shapes, and multiple bounding areas that can be connected or disconnected, can be utilized as appropriate to the requirements of specific application of embodiments of the invention.

The set of data 302 can include any of a variety of data, including raw data, source data, aggregate data, event-oriented data, geo-spatial data, reporting data, and/or any other data (or combination of data) stored and processed by an interest-driven business intelligence system or an interest-driven data visualization systems as appropriate to the requirements of specific application of embodiments of the invention. In a variety of embodiments, the data includes at least one dimension related to location data. The facts associated with the dimension(s) can be stored directly and/or encoded in accordance with several embodiments of the invention. Additionally, the location data can include a single point (e.g. a latitude, a longitude, and/or an elevation), a set of points, a geographic identifier (e.g. a city, state, address, zip code, etc. . . . ), and/or any other data that can be utilized to identify a location in space as appropriate to the requirements of specific applications of the invention. The bounding area 302 is defined based on bounding data describing one or more locations within a space. Bounding data can include, but is not limited to, geographic location data that identifies one or more points in space. The geographic location data can be coordinates that identify a single point, a set of points, and/or a location within a map. Additionally, the bounding data can include range data (e.g. a radius, a census-defined area such as city limits, etc. . . . ) that identifies a region around the point(s) that is included in the bounding area. In this way, data that is proximate to a defined area and/or has a proximity relationship to a set of locations can be included within the defined bounding area. Additionally, multiple sub-bounding areas can be combined together to create a single bounding area, thereby facilitating the generation of arbitrary bounding areas.

In many embodiments, the geographic location data includes facts and/or dimensions identifying location data within the data. The facts and dimensions can include both single dimensions (e.g. a dimension that identifies fact data including encoded location data) and multiple dimensions (e.g. multiple dimensions identifying one or more facts that identify a single location and/or multiple locations) as appropriate to the requirements of specific application of the invention. In many embodiments, the bounding data identifies arbitrary groupings of data that do not necessarily correspond to a geographical location; rather, the bounding data can identify the location of the data within any arbitrary space defined that is relevant to the data being analyzed as appropriate to the requirements of specific applications of the invention. In this way, the bounding data includes one or more points that identify a location and/or a region in space.

The set of included data 306 includes those pieces of data in the set of data 302 that have facts and/or dimensions corresponding to the bounding data defining the bounding area 302. This can include pieces of data that fall within the defined bounding area, pieces of data that fall on the defined bounding area, and/or pieces of data outside of the defined bounding area. For example, the set of data 302 can be aggregated into bins of data and the bounding area utilized to identify bins that fall within or on the bounding area. In this way, a portion of the binned data may actually be outside of the defined bounding area but still be included in the bounding region. Similarly, the bounding area 302 can be utilized to identifying data outside of a particular area. However, it should be noted that any bounding of data based on the bounding data can be utilized as appropriate to the requirements of specific applications of the invention.

Figure 3B:
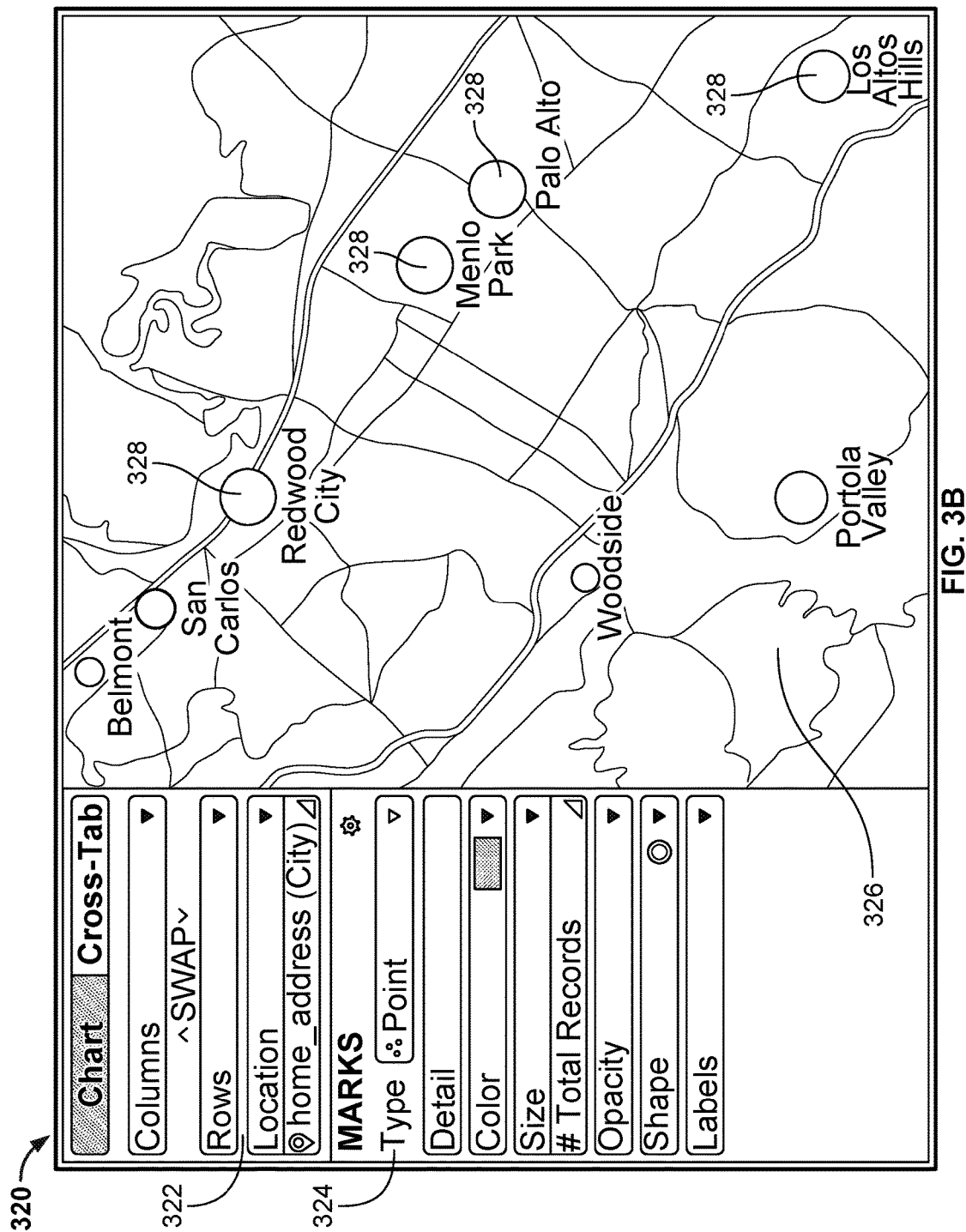
FIGS. 3B-3D are conceptual illustrations of user interfaces for defining and viewing geo-spatial reporting data in accordance with embodiments of the invention.

Geo-spatial data can be visualized in a variety of ways. Turning now to FIG. 3B, a conceptual illustration of a user interface for exploring geo-spatial reporting data in accordance with an embodiment of the invention is shown. The user interface 320 includes a geo-spatial data selector 322, a set of data visualization options 324, and a set of geo-spatial reporting data visualizations 328 overlaid on a geographic map 326. In a variety of embodiments, the geo-spatial data selector 322 provides a listing of dimensions within the reporting data that can be utilized to generate bounding areas based on bounding data. In several embodiments, the geo-spatial data selector 322 provides a listing of dimensions that will be displayed within a set of bounding areas. In a number of embodiments, the data visualization options 324 define metadata describing the visual appearance of the geo-spatial data. These options include the type of visual appearance, details to be displayed in the visualization, the color of the visualized data, the dimensions of the data that control the visual aspects of the visualized data, opacity, shape, labels, and any other visualization property as appropriate to the requirements of specific applications of embodiments of the invention. The geo-spatial reporting data visualizations 328 visually represent the data selected using the geo-spatial data selector according to the bounding area associated with each piece of data within the geo-spatial reporting data within the geographic map 326. In many embodiments, the geographic map 326 includes metadata describing a set of locations. In this way, facts in the geo-spatial reporting data are utilized to map each piece of geo-spatial reporting data to the appropriate bounding area defined in the geographic map 326; the geo-spatial reporting data visualizations 238 are generated based on the pieces of geo-spatial reporting data associated with a particular bounding area.

Figure 3C:
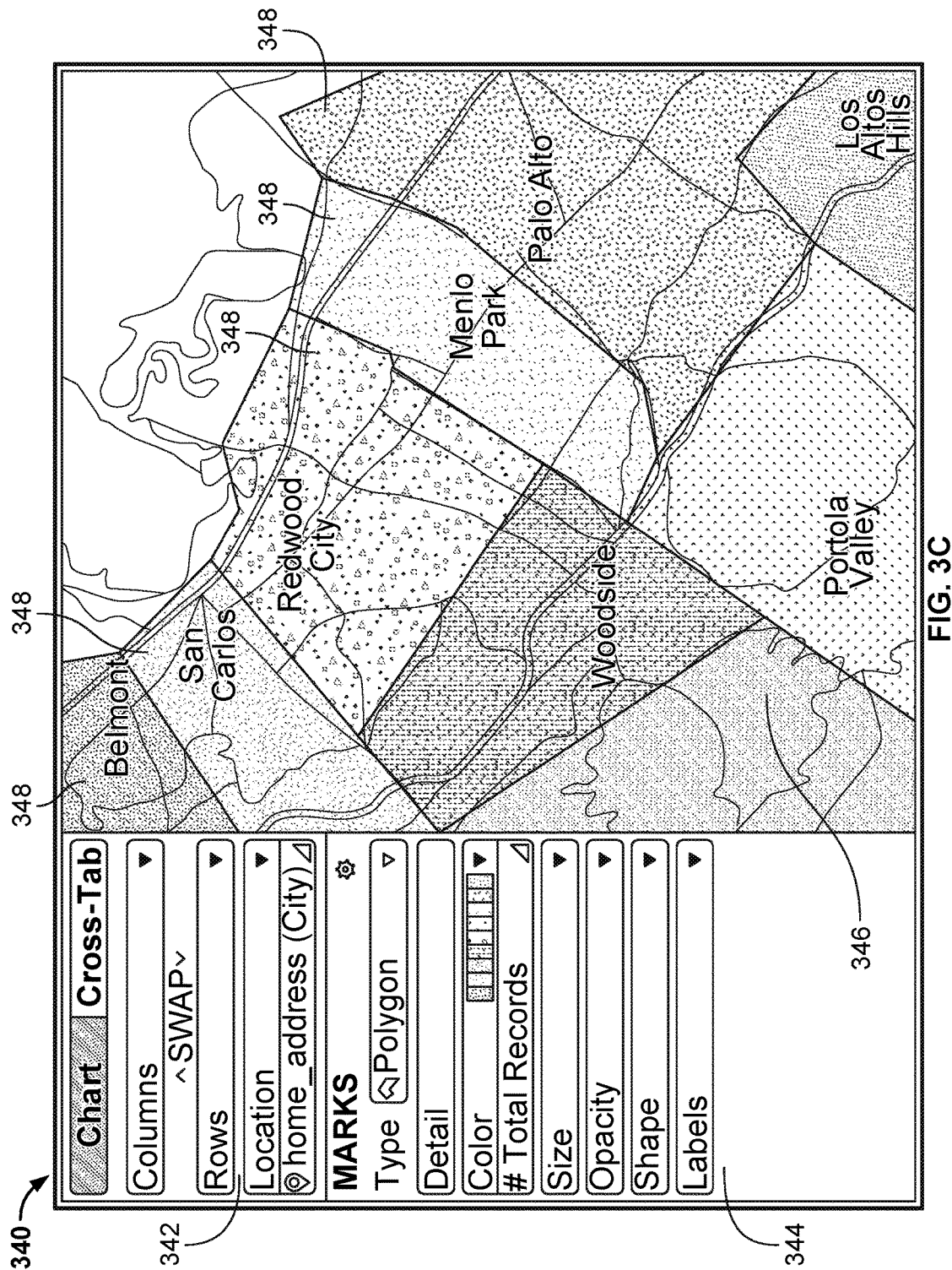

Turning now to FIG. 3C, a second example user interface for exploring geo-spatial reporting data in accordance with an embodiment of the invention is shown. The user interface 340 includes a geo-spatial data selector 342, a set of data visualization options 344, and a set of geo-spatial reporting data visualizations 348 overlaid on a geographic map 346. Geo-spatial data selector 342 and the set of data visualization options 344 are configured to control the data displayed and the visual appearance of that data in a manner similar to those described above. In the illustrated embodiment, the geo-spatial reporting visualizations 348 are shadings of the boundary areas defined in the geographic map 346. In this way, the color and opacity of the shaded regions provides a strong visual indicator of the underlying geo-spatial data being visualized within the user interface 340.

Figure 3D:
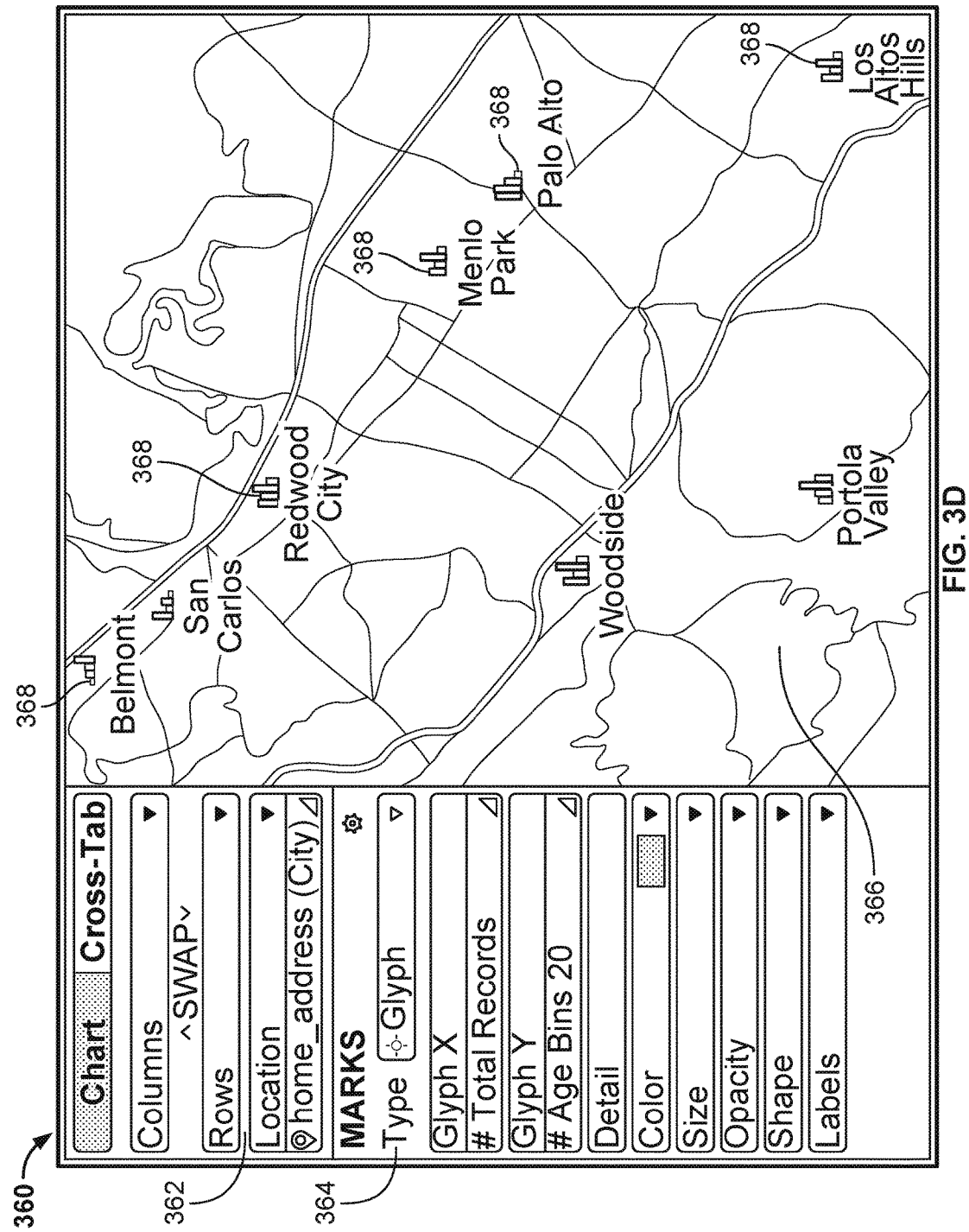

Turning now to FIG. 3D, a third example user interface for exploring geo-spatial reporting data in accordance with an embodiment of the invention is illustrated. The user interface 360 includes a geo-spatial data selector 362, a set of data visualization options 364, and a set of geo-spatial reporting data visualizations 368 overlaid on a geographic map 366. Geo-spatial data selector 362 and the set of data visualization options 364 are configured to control the data displayed and the visual appearance of that data in a manner similar to those described above. In the illustrated embodiment, the geo-spatial reporting visualizations 368 are glyph visualizations generated based on the data associated with the particular bounding areas of the geographic map 366. In many embodiments, glyph visualizations include sub-visualizations defined using the facts and dimensions of the pieces of geo-spatial reporting data associated with a particular bounding area. These sub-visualizations can be any visualization that can be displayed using an interest-driven data visualization system. These visualizations include, but are not limited to, bar graphs, pie charts, line graphs, point graphs, heat maps, trellised visualizations, time-series views of the data, event-oriented views of the data, additional geo-spatial representations of the data, and any other visual representation of the underlying data as appropriate to the requirements of specific applications of the invention. In this way, glyph visualizations dynamically visualize multiple dimensions of the data associated with a particular geographic region. This can provide the ability to view and analyze multiple dimensions of the reporting data in an efficient manner. For example, the geo-spatial reporting visualizations 368 in user interface 360 include histogram reporting visualizations. The histogram reporting visualizations include a two-dimensional plot with a set of data associated with the x-axis and a set of data associated with the y-axis. The set of data visualization options 364 include options for assigning particular dimensions of the geo-spatial reporting data to both the x-axis and the y-axis in order to generate a variety of histogram reporting visualizations. It should be noted that, in many embodiments, each type of geo-spatial reporting visualization can have its own unique data and the set of data visualization options is dynamically generated in order to define and manipulate a particular variety of geo-spatial reporting visualization. However, any technique for assigning facts and/or dimensions to the properties of a sub-visualization can be utilized as appropriate to the requirements of specific applications of embodiments of the invention.

While a specific example of geo-spatial data and visualizations of geo-spatial data are conceptually illustrated in FIGS. 3A-D, any bounding of data can be utilized in the generation of geo-spatial data as appropriate to the requirements of specific applications in accordance with embodiments of the invention. Additionally, any of a variety of visualizations, including those that do not map geo-spatial data using a geographic map, can be utilized as appropriate to the requirements of specific applications in accordance with embodiments of the invention. Techniques for obtaining and generating geo-spatial data in accordance with embodiments of the invention are discussed further below.

Obtaining Geo-Spatial Reporting Data

By analyzing data bounded by a set of bounding data, certain patterns of interest can be identified for exploration. Many of these patterns are not apparent until the data is bounded along the dimensions. Geo-spatial reporting data includes data organized in a variety of dimensions and bounded according to at least one of the dimensions.

Figure 4:
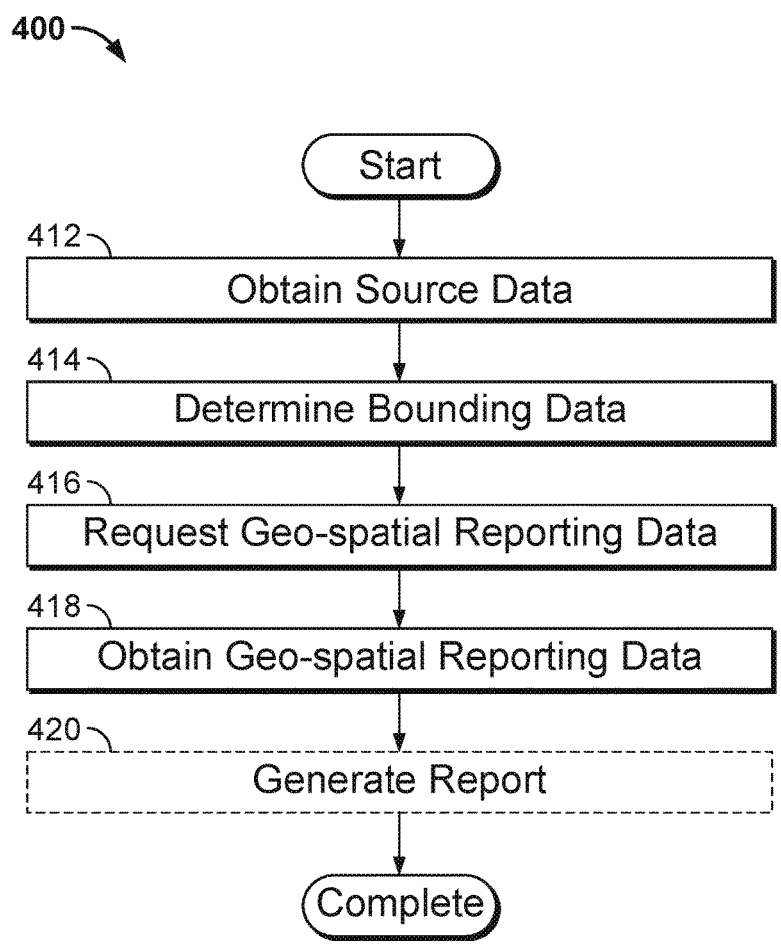
FIG. 4 is a flow chart illustrating a process for obtaining geo-spatial reporting data in accordance with an embodiment of the invention.

Interest-driven data visualization systems in accordance with embodiments of the invention are configured to obtain geo-spatial reporting data. A process for obtaining geo-spatial reporting data in accordance with an embodiment of the invention is illustrated in FIG. 4. The process 400 includes obtaining (410) source data and determining (412) bounding data. Geo-spatial reporting data is requested (414) and geo-spatial reporting data is obtained (416). In a variety of embodiments, a report is generated (418).

In many embodiments, source data is obtained (410) utilizing processes similar to those described above. In a number of embodiments, bounding data is determined (412) based on one or more dimensions contained within pieces of the obtained (410) source data. As described above, bounding data identifies one or more dimensions of the source data; in a variety of embodiments, the identified dimensions are related to geographic locations. The bounding data can be determined (412) dynamically by an interest-driven data visualization system and/or based on reporting data requirements determined during the exploration of the source data as appropriate to the requirements of specific applications in accordance with embodiments of the invention. In several embodiments, geo-spatial reporting data is requested (414) by creating geo-spatial request data identifying at least one piece of source data and the determined (412) bounding data. In a variety of embodiments, the request (414) for geo-spatial reporting data is transmitted to an interest-driven business intelligence system. In many embodiments, geo-spatial reporting data is obtained (416) from an interest-driven business intelligence system. In a number of embodiments, geo-spatial reporting data is obtained (416) based on data already present within an interest-driven data visualization system. In several embodiments, a report is generated (418) based on the obtained (416) geo-spatial reporting data.

Although a specific process for obtaining geo-spatial reporting data is described above with respect to FIG. 4, any of a variety of processes, including those that align the data along multiple bounding dimensions, can be utilized in accordance with embodiments of the invention. Processes for the creation and updating of geo-spatial data in accordance with embodiments of the invention are discussed further below.

Obtaining Geo-Spatial Data

Figure 5:
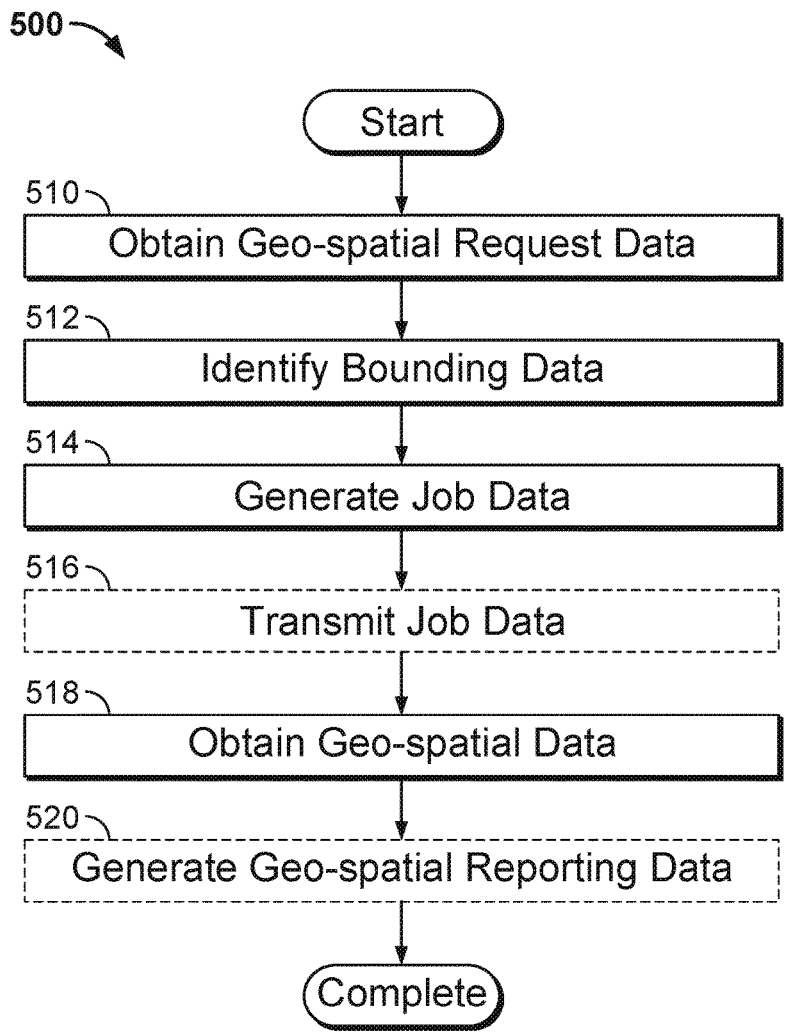
FIG. 5 is a flow chart illustrating a process for obtaining geo-spatial data in accordance with an embodiment of the invention.

During the exploration of data, particular features of the data may warrant additional inspection. Many of these pieces of data provide a variety of insights into the data when analyzed in conjunction with disparate pieces of data (e.g. pieces of data not included in the data currently being explored) occurring in relation to the pieces of data. For example, data describing a users' interactions with a particular page within a website can provide useful insights regarding users' interactions (or lack thereof) within another page within the website in particular locations, i.e. geographic areas. By analyzing the usage of the pages based on location data, pages within the website that perform well (or poorly) can be identified and additional analysis can be performed with respect to those portions of the web site. This analysis can then be utilized to better target particular pages to particular locations, improving the performance of those pages with respect to a particular audience. In a variety of embodiments, the performance of the pages in a particular location can be tracked over time. As discussed above, geo-spatial data is bounded according to one or more pieces of bounding data. Interest-driven business intelligence server systems in accordance with embodiments of the invention are configured to obtain geo-spatial data by compiling an interest-driven data pipeline to obtain the necessary data bounded according to the bounding data. A process for obtaining geo-spatial data in accordance with an embodiment of the invention is illustrated in FIG. 5. The process 500 includes obtaining (510) geo-spatial request data and identifying (512) bounding data. Job data is generated (514) and, in many embodiments, job data is transmitted (516). Geo-spatial data is obtained (518) and, in a number of embodiments, geo-spatial reporting data is generated (520).

In a variety of embodiments, geo-spatial request data is obtained (510) from an interest-driven data visualization system. Geo-spatial request data includes, but is not limited to, geo-spatial data metadata and/or requested location-based facts. In several embodiments, bounding data is identified (512) within the obtained (510) geo-spatial request data. In a number of embodiments, the generated (514) job data configures a distributed computing platform to create geo-spatial data fulfilling the geo-spatial data and bounded based on the identified (512) bounding data. In many embodiments, the generated (514) job data takes into account source data already present within an interest-driven business intelligence server system that fulfills a portion of the obtained (510) geo-spatial request data. In a variety of embodiments, the job data is transmitted (516) to a distributed computing platform utilizing techniques similar to those described above. The obtained (518) geo-spatial data includes geo-spatial data metadata describing the dimensions of the geo-spatial data and/or the facts (e.g. rows of data) corresponding to the dimensions described in the geo-spatial data metadata and/or the obtained (510) geo-spatial request data. In several embodiments, the obtained (518) geo-spatial data includes additional dimensions and/or facts not directly requested in the obtained (510) geo-spatial request data. In a number of embodiments, geo-spatial reporting data is generated (520) based on the obtained (510) geo-spatial request data and the obtained (518) geo-spatial data and bounded by the identified (512) bounding data. In several embodiments, the obtained (518) geo-spatial data is bounded based on the bounding data utilizing techniques similar to those described above.

In a variety of embodiments, the generated (514) job data and/or the obtained (518) geo-spatial data can be adjusted in order to account for differences between data sources providing the raw data utilized in the creation of the data used throughout the interest-driven business intelligence server system. Adjustments to data include, but are not limited to, accounting for encoding differences between systems and correlating varying location description information across systems. Bounding of data can be performed by shifting the data to a common format and/or by performing mappings of data to a common set of data (e.g. a common dimension). For example, with respect to location-based data, data acquired from multiple sources can all be converted to a common geographic coordinate system in order to account for different techniques utilized to identify a particular location across systems. Similarly, location-based data can be adjusted based on threshold values to account for differences in precision of the stored location data between the variety of systems providing data. Additionally, with respect to identification-based data (e.g. user IDs) that may be associated with the geo-spatial data, a variety of universal tracking information can be utilized to map identification-based data to the universal tracking information in order to account for differences between the identification-based data across the systems providing the data. In this way, users can be identified across disparate systems (and disparate portions within a system) in order to provide the ability to analyze the user's data across the systems and different geographic regions.

A specific process for obtaining geo-spatial data is described above with respect to FIG. 5; however, any of a variety of processes, including those that obtain geo-spatial data in response to a request for data other than a job transmitted to a distributed computing platform, can be utilized in accordance with embodiments of the invention. Techniques for bounding data according to particular locations in accordance with embodiments of the invention are described below.

Bounding (Structured) Data

Figure 6:
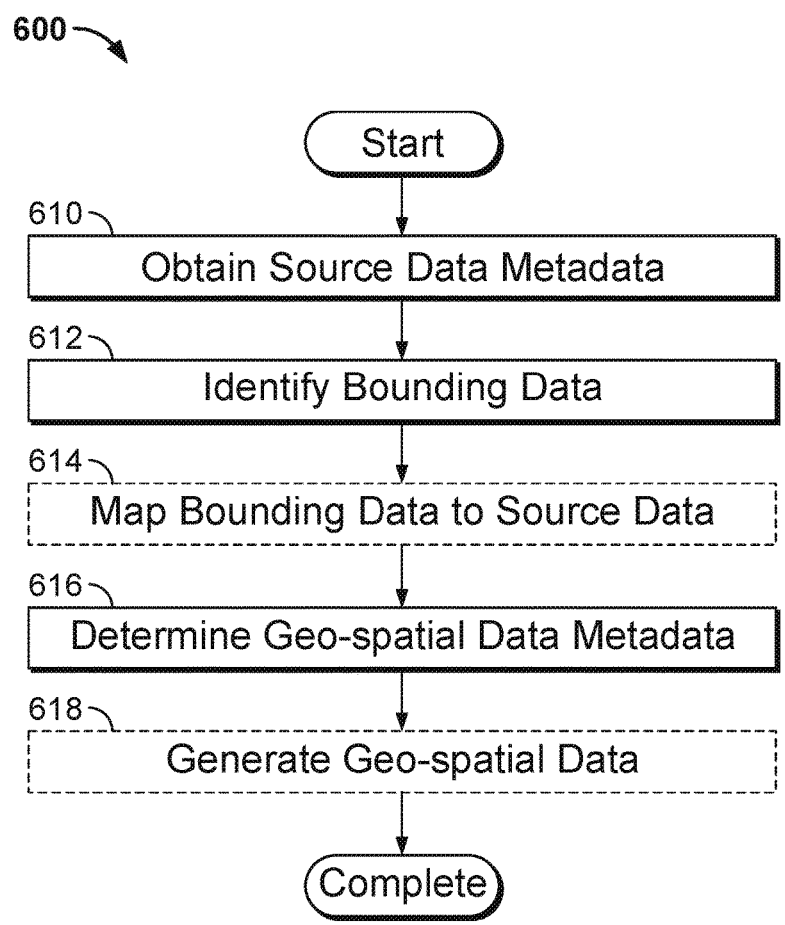
FIG. 6 is a flow chart illustrating a process for bounding geo-spatial data in accordance with an embodiment of the invention.

In many cases, analysts want to explore trends occurring in data already present in an interest-driven business intelligence system. In this way, the analysts can utilize the existing data to identify interesting features of the data with respect to particular geographic locations. Interest-driven business intelligence server systems in accordance with many embodiments of the invention are configured to determine geo-spatial data metadata based on source data already present within the interest-driven business intelligence system. A process for bounding data in accordance with an embodiment of the invention is illustrated in FIG. 6. The process 600 includes obtaining (610) source data metadata and identifying (612) bounding data. In many embodiments, bounding data is mapped (614) to source data. Geo-spatial data metadata is determined (616) and, in a variety of embodiments, geo-spatial data is generated (618).

In many embodiments, source data metadata describes the pieces of data available within a set of source data. In several embodiments, the source data describes one or more dimensions (e.g. columns) of data within the set of source data. In many embodiments, structured source data metadata is obtained (610) utilizing techniques similar to those described above. In a number of embodiments, bounding data is identified (612) based on the pieces of data available within the source data. In a variety of embodiments, the bounding data (614) is mapped to one or more dimensions described in the source data metadata. In this way, differences between the identified (612) bounding data and the obtained (610) source data metadata can be resolved in order to create geo-spatial data fulfilling a particular request. Additionally, the bounding data can be mapped (614) to source data utilizing processes similar to those described above. In several embodiments, geo-spatial data metadata is determined (616) based on the obtained (610) source data metadata and the identified (612) bounding data using processes similar to those described above. If applicable, the mapped (614) bounding data can also be utilized in the determination (616) of the geo-spatial data metadata. In many embodiments, geo-spatial data is generated (618) based on the geo-spatial data metadata and fact(s) (e.g. rows of data) contained within the source data described by the obtained (610) source data metadata utilizing techniques similar to those described above.

Although a specific process for bounding source data is described above with respect to FIG. 6, any of a variety of processes, including those that bound aggregate data, event-oriented data, and/or existing geo-spatial data, can be utilized in accordance with embodiments of the invention. Processes for creating aggregate data based on geo-spatial data in accordance with embodiments of the invention are discussed further below.

Generating Aggregate Reporting Data based on Geo-Spatial Data

Figure 7A:
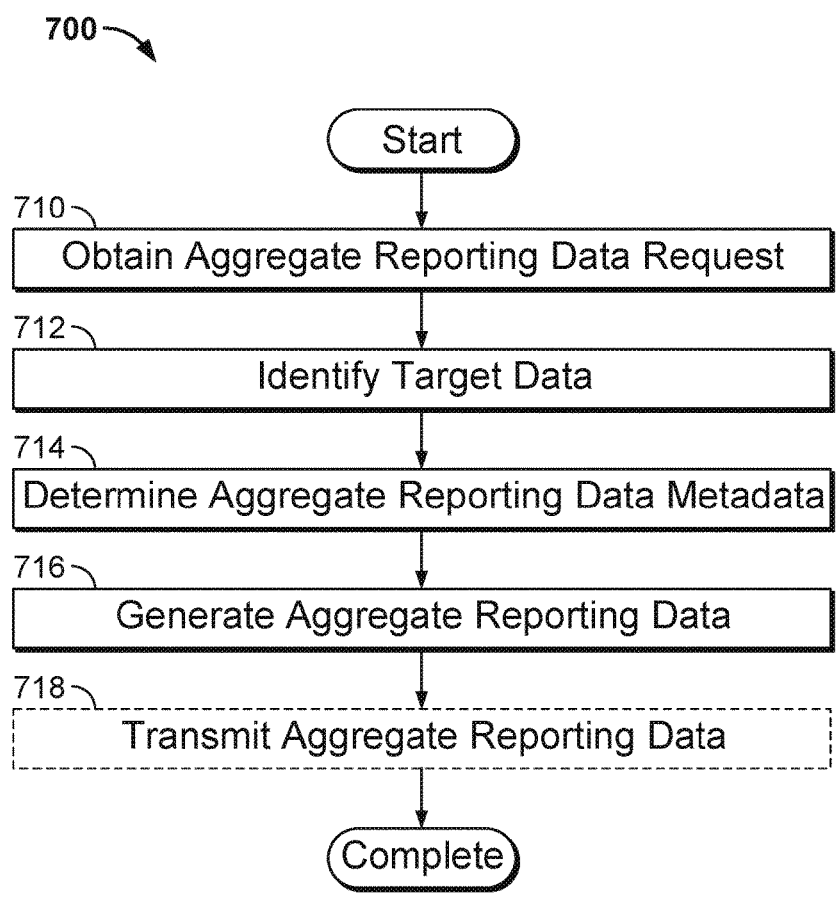
FIG. 7A is a flow chart illustrating a process for generating aggregate reporting data based on geo-spatial data in accordance with an embodiment of the invention.

During the exploration of geo-spatial data, interesting features of the data can be identified and it is desirable to drill down into those features of the geo-spatial data. In order to support the additional analysis of geo-spatial data, aggregate reporting data can be generated in order to augment the identified features within the data. Returning to the example described above with respect to FIG. 5, when a particular web page is identified within the geo-spatial data, aggregate data describing the interactions across all users of the web site can be obtained. This aggregate data can be used to perform an in-depth exploration of the interactions with the web page. At the same time, the resources of the interest-driven business intelligence system are efficiently utilized by focusing the data retrieved and processed in the exploration of the data to those portions of the data that contain information relevant to the exploration of the data. Interest-driven business intelligence server systems in accordance with embodiments of the invention are configured to generate aggregate reporting data based on geo-spatial data. A process for generating aggregate data based on geo-spatial data in accordance with an embodiment of the invention is illustrated in FIG. 7A. The process 700 includes obtaining (710) an aggregate reporting data request and identifying (712) target data. Aggregate reporting data metadata is determined (714) and aggregate reporting data is generated (716). In a variety of embodiments, aggregate reporting data is transmitted (718).

An aggregate data reporting request includes, but is not limited to, one or more dimensions and/or facts within a piece of geo-spatial reporting data. Other data can be included in an aggregate reporting data request as appropriate to the requirements of specific applications in accordance with embodiments of the invention. In a variety of embodiments, an aggregate reporting data request is obtained (710) from an interest-driven data visualization system. In several embodiments, the obtained (710) aggregate reporting data requests identifies dimensions and/or facts identified during the exploration of at least one piece of geo-spatial reporting data and/or at least one piece of aggregate reporting data. In a number of embodiments, target data is identified (712) based on the dimensions and/or facts identified in the obtained (710) reporting data request. In a variety of embodiments, the target data is identified (712) based on source data metadata describing the dimensions of data available within source data stored using an interest-driven business intelligence server system. In a number of embodiments, the source data metadata describes facts and/or dimensions that can be obtained from a distributed computing platform. In several embodiments, aggregate reporting data metadata is determined (714) based on the obtained (710) aggregate reporting data request. In a variety of embodiments, aggregate reporting data metadata is determined (714) based on the identified (712) target data. As described above, aggregate reporting data is generated (716) by associating a plurality of facts (e.g. rows of data) that are obtained based on the determined (714) aggregate reporting data metadata. Generating (716) aggregate reporting data can include filtering and/or aggregating source data, event-oriented data, geo-spatial data, and/or aggregate data utilizing processes similar to those described above as appropriate to the requirements of specific applications in accordance with embodiments of the invention. In a number of embodiments, the generated (716) aggregate reporting data is transmitted (718) to one or more interest-driven data visualization systems utilizing techniques similar to those described above.

Specific processes for generating aggregate reporting data are described above with respect to FIG. 7A; however, any of a variety of processes, including those that generate aggregate reporting data based on data other than geo-spatial data and those that store the determined aggregate reporting data metadata, can be utilized in accordance with embodiments of the invention. Techniques for creating geo-spatial reporting data based on aggregate data in accordance with embodiments of the invention are discussed further below.

Generating Geo-Spatial Reporting Data Based on Aggregate Data

Figure 7B:
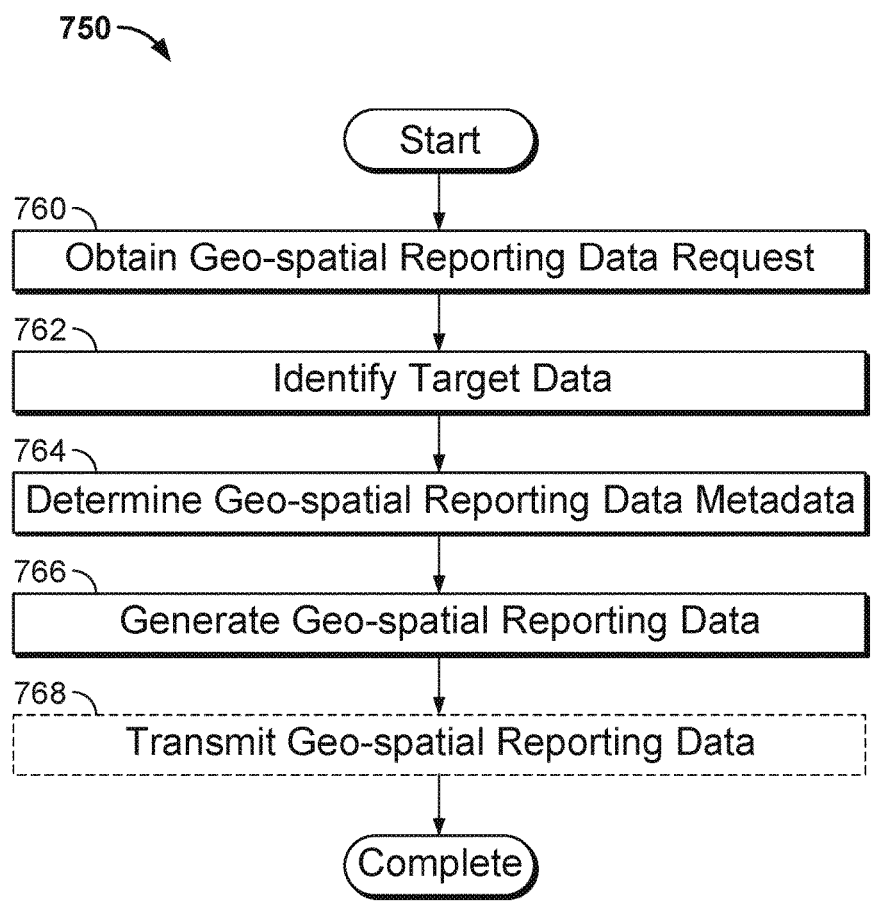
FIG. 7B is a flow chart illustrating a process for generating geo-spatial reporting data based on aggregate data in accordance with an embodiment of the invention.

During the exploration of aggregate data, interesting trends within the data can be identified and it is desirable to drill down into those trends. In order to support the additional analysis of the aggregate data, geo-spatial reporting data can be generated in order to bring in additional context regarding the data being explored for a particular location or locations. Returning now to the example described with respect to FIGS. 5 and 7A, when analyzing the aggregate data describing the interactions with web page, a particular class of users can be identified that exhibit interesting interaction patterns. Geo-spatial data can be generated that describes the interactions that the identified class of users takes with multiple pages within the web site. In this way, the geo-spatial data generated based on the aggregate data can be utilized to explore the interactions particular groups of users in one or more locations have with the web site. By exploring the group of users, potential improvements to the web site can be identified that would improve the performance of the web site with respect to the users similar to those in the identified group of users. Interest-driven business intelligence server systems in accordance with embodiments of the invention are configured to generate geo-spatial reporting data based on aggregate data. A process for generating aggregate data based on geo-spatial data in accordance with an embodiment of the invention is illustrated in FIG. 7B. The process 750 includes obtaining (760) a geo-spatial data request. Target data is identified (762) and geo-spatial reporting data metadata is determined (764). Geo-spatial reporting data is generated (766) and, in several embodiments, geo-spatial reporting data is transmitted (768).

A geo-spatial data reporting request includes, but is not limited to, one or more dimensions and/or facts within a piece of geo-spatial reporting data along with bounding data identifying at least one of the dimensions used to bound the data. Other data can be included in a geo-spatial reporting data request as appropriate to the requirements of specific applications in accordance with embodiments of the invention. In a variety of embodiments, a geo-spatial reporting data request is obtained (760) from an interest-driven data visualization system. In several embodiments, the obtained (760) geo-spatial reporting data request identifies dimensions and/or facts identified during the exploration of at least one piece of geo-spatial reporting data and/or aggregate reporting data. In a number of embodiments, target data is identified (762) utilizing processes similar to those described above. The determined (764) geo-spatial reporting data metadata can include one or more pieces of bounding data. In several embodiments, geo-spatial reporting data metadata is determined (764) based on the obtained (760) geo-spatial reporting data request. In a variety of embodiments, geo-spatial reporting data metadata is determined (764) based on the identified (762) target data. As described above, geo-spatial reporting data is generated (766) by associating a plurality of facts (e.g. rows of data) that are obtained based on the determined (764) geo-spatial reporting data metadata. The generated (766) geo-spatial reporting data includes bounding the plurality of facts within the geo-spatial reporting data according to the bounding data. Generating (766) geo-spatial reporting data can include filtering and/or aggregating source data, geo-spatial data, event-oriented data, and/or aggregate data utilizing processes similar to those described above as appropriate to the requirements of specific applications in accordance with embodiments of the invention. In a number of embodiments, the generated (766) geo-spatial reporting data is transmitted (768) to one or more interest-driven data visualization systems utilizing techniques similar to those described above.

Although a specific process for generating geo-spatial reporting data is described above with respect to FIG. 7B, any of a variety of processes, including those that generate geo-spatial reporting data based on data other than aggregate data, can be utilized in accordance with embodiments of the invention. Processes for updating geo-spatial data in accordance with embodiments of the invention are described in detail below.

Updating Geo-Spatial Data

Figure 8:
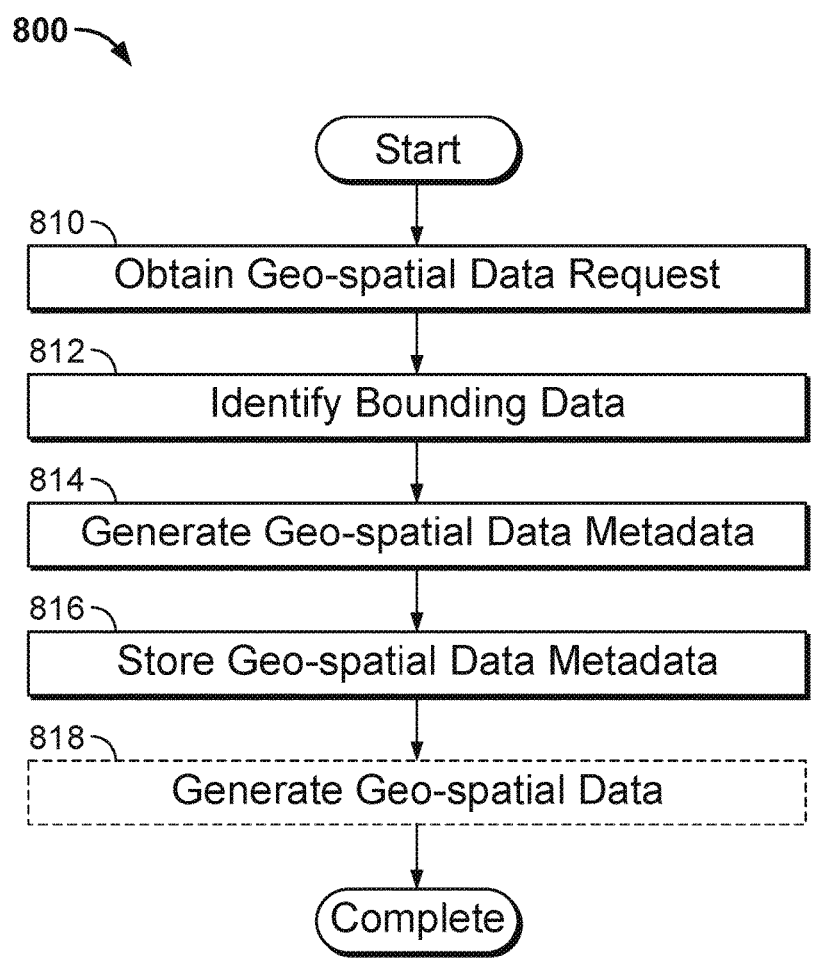
FIG. 8 is a flow chart illustrating a process for updating geo-spatial data in accordance with an embodiment of the invention.

As described above, trends are often identified across multiple geographic locations described within the data being explored. As part of the analysis of the identified trends, it is often beneficial to continue monitoring the identified trends over a period of time. Interest-driven business intelligence server systems in accordance with embodiments of the invention are configured to store geo-spatial data metadata and provide updated geo-spatial data on request. A process for updating geo-spatial data in accordance with an embodiment of the invention is illustrated in FIG. 8. The process 800 includes obtaining (810) a geo-spatial data request and identifying (812) bounding data. Geo-spatial data metadata is generated (814) and geo-spatial data metadata is stored (816). In a number of embodiments, geo-spatial data is generated (818).

In a number of embodiments, a geo-spatial data request is obtained (810) and bounding data is identified (812) utilizing processes similar to those described above. In many embodiments, generating (814) geo-spatial data metadata is based on the geo-spatial data request and/or the bounding data using processes similar to those described above. The geo-spatial data metadata can be stored (816) so that generating (818) geo-spatial data can be performed in response to a request for the geo-spatial data. The geo-spatial data metadata can be stored using a data mart, an interest-driven data visualization system, an interest-driven business intelligence server system, and/or a distributed computing platform as appropriate to the requirements of specific applications in accordance with embodiments of the invention.

In a variety of embodiments, geo-spatial data is generated (818) using the geo-spatial metadata and source data stored in an interest-driven business intelligence system utilizing processes similar to those described above. In many embodiments generating (818) geo-spatial data includes identifying redundant information already present within an interest-driven business intelligence server system and/or a data mart. In a variety of embodiments, redundant information is identified using reporting data schemas defining the structure of reporting data and/or source data schemas defining the structure of source data. In many embodiments, redundant information is determined using one or more files stored using the interest-driven business intelligence server system; redundancies can be determined using the data contained in the files and/or metadata associated with the files, including the creation date of the files and/or the last modified date of the files. In several embodiments, job data can be created and executed in order to generate (818) geo-spatial data from a distributed computing platform that is not present in the redundant information. Based on the identified redundant information, the job data can be targeted to minimize the amount of duplicate data retrieved from a distributed computing platform. This allows the resources of the distributed computing platform and/or the interest-driven business intelligence server system to be more efficiently used than if the redundant information not been identified.

A specific process for updating geo-spatial data is described above with respect to FIG. 8; however, any of a variety of processes, including those that generate updated geo-spatial data utilizing techniques other than those described above, can be utilized in accordance with embodiments of the invention. Techniques for generating geo-spatial data ordered by one or more dimensions in accordance with embodiments of the invention are described in more detail below.

Updating Geo-Spatial Data

As described above, trends are often identified across multiple geographic locations described within source data. In many embodiments, these trends occur not only with respect to the geographic location of the trend, but also with respect to one or more pieces of ordering data. For example, fads can be localized both to a particular geographic location and a particular point in time. By analyzing the fad across time, the spread of the fad across geographic locations can be tracked and additional insights into the fad can be determined. Geo-spatial data generated utilizing techniques similar to those described above can be grouped by identifying ordering data based on one or more dimensions across the pieces of geo-spatial data and creating ordered geo-spatial data including data taken from the plurality of pieces of geo-spatial data aligned (e.g. grouped by or ordered by) according to the ordering data. In many embodiments, the ordering data includes one or more dimensions contained within the fact tables and/or dimension tables associated with the geo-spatial data. In several embodiments, the dimensions included in the ordering data are determined based on reporting data requirements. By combining the ordering data and the bounding with facts (e.g. rows of data) stored within each of the fact tables and/or dimension tables, aligning the data according to the ordering data, and bounding the data according to the bounding data, ordered geo-spatial (reporting) data can be generated. Similarly, event-oriented data can be bounded using bounding data to generate the ordered geo-spatial data as appropriate to the requirements of specific applications in accordance with embodiments of the invention.

Figure 9:
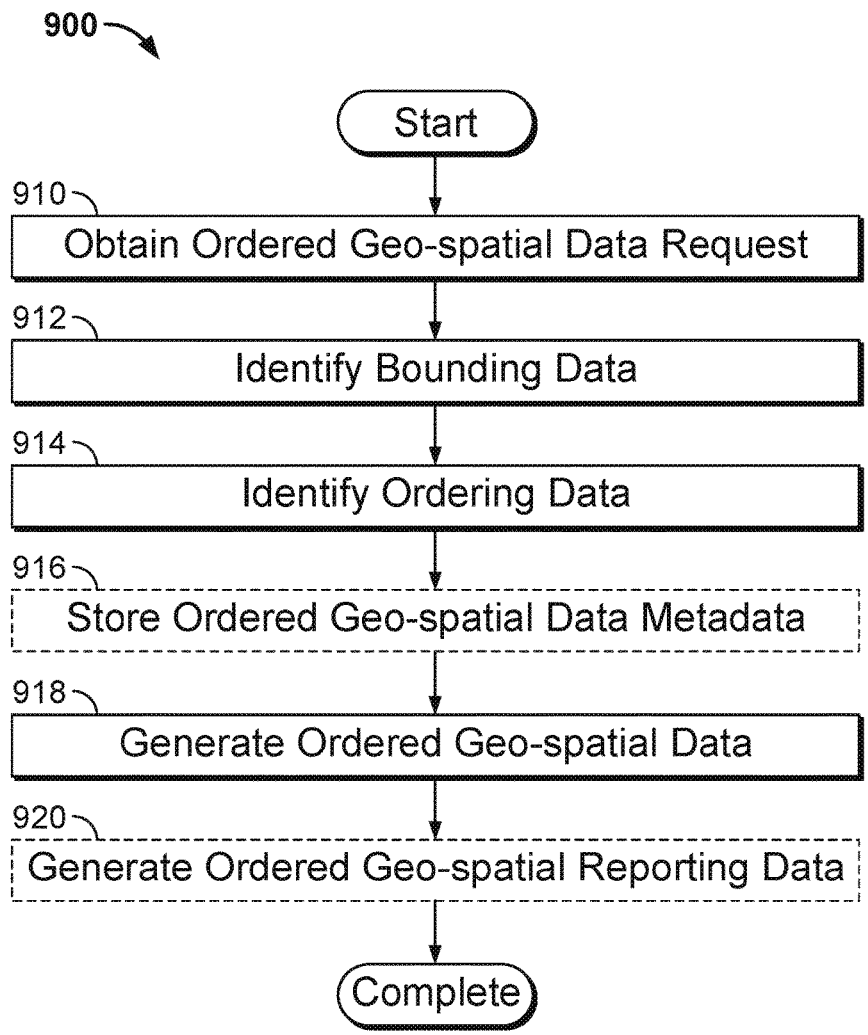
FIG. 9 is a flow chart illustrating a process for generating geo-spatial data ordered according to one or more events in accordance with an embodiment of the invention.

A process for generating ordered geo-spatial data in accordance with an embodiment of the invention is shown in FIG. 9. The process 900 includes obtaining (910) an ordered geo-spatial data request. Bounding data is identified (912), ordering data is identified (914), and in a variety of embodiments ordered geo-spatial data metadata is stored (916). Ordered geo-spatial data is generated (918) and, in a number of embodiments, ordered geo-spatial reporting data is generated (920).

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven business intelligence system, comprising:
　raw data storage configured to contain raw data and perform extract, transform, and load (ETL) processes;
　a data mart configured to:
　　contain metadata that describes the raw data; and
　　contain aggregate data, wherein the aggregate data comprises structured data generated using ETL processes from the raw data; and
　an intermediate processing layer;
　wherein the intermediate processing layer is configured to automatically:
　　generate metadata describing the raw data;
　　derive reporting data requirements from at least one report specification based on the metadata; and
　　compile an interest-driven data pipeline based upon the reporting data requirements, where compiling the interest-driven data pipeline comprises:
　　　generating ETL processing jobs to generate geo-spatial data and aggregate data from the raw data by:
　　　　filtering the raw data based on the metadata describing the raw data;
　　　　determining bounding data based on the metadata describing the raw data;
　　　　bounding the filtered raw data based on the bounding data;
　　　　generating geo-spatial data based on the bounded filtered raw data;
　　　　storing the geo-spatial data in the data mart, wherein the geo-spatial data is stored as first parallel arrays of data with a first parallel array representing first values of a first particular field of data;
　　　　applying transformations to the raw data based on the metadata describing the raw data;
　　　　generating aggregate data based on the transformed data; and
　　　　storing the aggregate data in the data mart, wherein the aggregate data is stored as second parallel arrays of data with a second parallel array representing second values of a second particular field of data;
　　　identifying ordering data based on a dimension across a plurality of pieces of the geo-spatial data;
　　　ordering, based on the ordering data, the plurality of pieces of the geo-spatial data to obtain ordered geo-spatial data;
　　　determining a fad based on the ordered geo-spatial data;
　　　generating reporting data including data satisfying the reporting data requirements based on the geo-spatial data; and
　　　storing the reporting data in the data mart for exploration by an interest-driven data visualization system.

2. The interest-driven business intelligence system of claim 1, wherein the raw data comprises unstructured data.

3. The interest-driven business intelligence system of claim 1, wherein the raw data storage is a data warehouse.

4. The interest-driven business intelligence system of claim 3, wherein the data warehouse is implemented utilizing a system selected from the group consisting of a distributed computing system, a database management system, and a NoSQL database.

5. The interest-driven business intelligence system of claim 3, wherein the data warehouse is a distributed computing system.

6. The interest-driven business intelligence system of claim 3, wherein the data warehouse is configured to store data generated utilizing the intermediate processing layer.

7. The interest-driven business intelligence system of claim 3, wherein the intermediate processing layer is configured to generate data warehouse requests.

8. The interest-driven business intelligence system of claim 7, wherein the data warehouse requests comprise MapReduce operations.

9. The interest-driven business intelligence system of claim 1, wherein the intermediate processing layer is implemented utilizing a system selected from the group consisting of a distributed computing system, a database management system, and a NoSQL database system.

10. The interest-driven business intelligence system of claim 1, further comprising an interest-driven data visualization system;
　wherein the interest-driven data visualization system is configured to:
　　receive metadata describing the raw data from the intermediate processing layer; and
　　generate a user interface enabling user exploration of the metadata to define at least one report specification, where the user exploration involves selection of additional reporting data based on the metadata.

11. The interest-driven business intelligence system of claim 10, wherein the interest-driven data visualization system is configured to display an indication based upon interactive exploration of the at least one report.

12. The interest-driven business intelligence system of claim 1, wherein compiling the interest-driven pipeline further comprises generating ETL processing jobs to generate aggregate data from geo-spatial data by:
　identifying at least one dimension within a piece of geo-spatial data;
　obtaining raw data corresponding to the identified at least one dimension;
　applying transformations to the obtained raw data based on the metadata describing the obtained raw data;
　generating aggregate data based on the transformed data; and
　storing the aggregate data in the data mart.

13. The interest-driven business intelligence system claim 1, wherein compiling the interest-driven pipeline further comprises generating ETL processing jobs to generate geo-spatial data from aggregate data by:
　identifying at least one dimension within a piece of aggregate data;
　obtaining raw data corresponding to the identified at least one dimension;
　filtering the obtained raw data based on the metadata describing the obtained raw data;
　determining bounding data based on the metadata describing the obtained raw data;

bounding the filtered obtained raw data based on the bounding data;
generating geo-spatial data based on the bounded data; and
storing the geo-spatial data in the data mart.

14. The interest-driven business intelligence system of claim 1, wherein the data mart is contained within the intermediate processing layer.

15. The interest-driven business intelligence system of claim 1, wherein the bounding data comprises at least one dimension identified in the metadata describing the raw data.

16. The interest-driven business intelligence system of claim 15, wherein bounding the filtered raw data based on the bounding data comprises determining pieces of raw data that identifying a location that is within the location described by the bounding data.

17. The interest-driven business intelligence system of claim 16, wherein:
bounding the filtered raw data based on the bounding data further comprises mapping at least two dimensions within the filtered raw data to a common set of data; and
the common set of data is based on the bounding data.

18. The interest-driven business intelligence system of claim 1, wherein the bounding data comprises a latitude and a longitude.

19. The interest-driven business intelligence system of claim 1, wherein the bounding data comprises a location.

20. The interest-driven business intelligence system of claim 19, wherein the bounding data comprises a bounding region described relative to the location.

21. A method for creating a report utilizing an interest-driven business intelligence system, comprising:
performing extract, transform, and load (ETL) processes;
storing raw data in raw data storage using an interest-driven business intelligence system, where the raw data comprises unstructured data;
generating metadata describing the raw data using the interest-driven business intelligence system;
receiving report definitions generated utilizing the metadata describing the raw data using the interest-driven business intelligence system;
automatically generating reporting data requirements derived from report definitions using the interest-driven business intelligence system;
automatically compiling an interest-driven data pipeline that is part of the interest-driven business intelligence system using the reporting data requirements and the raw data;
obtaining geo-spatial data from the interest-driven data pipeline based on the generated reporting data requirements using the interest-driven business intelligence system, where the geo-spatial data comprises a set of dimensions and the geo-spatial data is bounded based on at least one dimension in the set of dimensions;
storing the geo-spatial data in a data mart, wherein the geo-spatial data is stored as first parallel arrays of data with a first parallel array representing second values of a first particular field of data;
filtering the raw data based on the metadata describing the raw data;
applying transformations to the raw data based on the metadata describing the raw data;
generating aggregate data based on the transformed data, wherein the aggregate data comprises structured data generated using ETL processes from the raw data;
storing the aggregate data in the data mart, wherein the aggregate data is stored as second parallel arrays of data with a second parallel array representing second values of a second particular field of data;
    identifying ordering data based on a dimension across a plurality of pieces of the geo-spatial data;
    ordering, based on the ordering data, the plurality of pieces of the geo-spatial data to obtain ordered geo-spatial data;
    determining a fad based on the ordered geo-spatial data;
    identifying ordering data based on a dimension across a plurality of pieces of the geo-spatial data;
    ordering, based on the ordering data, the plurality of pieces of the geo-spatial data to obtain ordered geo-spatial data;
    determining a fad based on the ordered geo-spatial data;
generating reporting data from the reporting data requirements using the interest-driven data pipeline, where the reporting data is based on a portion of the geo-spatial data; and
storing the generated reporting data in the data mart within the interest-driven business intelligence system.

* * * * *

UNITED STATES PATENT AND TRADEMARK OFFICE
CERTIFICATE OF CORRECTION

PATENT NO. : 10,140,346 B2  
APPLICATION NO. : 14/313191  
DATED : November 27, 2018  
INVENTOR(S) : Brown et al.

Page 1 of 1

It is certified that error appears in the above-identified patent and that said Letters Patent is hereby corrected as shown below:

In Page 2, References Cited, Item (56), U.S. Patent Documents, Column 1, Cite No. 30, US2007/0136683, delete "Heidari" and insert --Heidari et al.--, therefor.

In Page 2, References Cited, Item (56), U.S. Patent Documents, Column 1, Cite No. 38, US2008/0313345, delete "Bernardin" and insert --Bernardin et al.--, therefor.

In Page 2, References Cited, Item (56), U.S. Patent Documents, Column 2, Cite No. 24, US2014/0258209, delete "Eshleman" and insert --Eshleman et al.--, therefor.

In Page 3, References Cited, Item (56), Other Publications, Column 2, Cite No. 8, delete "Kossmann, "The State of the Art in Distributed Query Processing", ACM Computing Surveys, vol. 32 Issue 4, Dec. 2000, Dec. 2000, 422-469." and insert --Kossmann, "The State of the Art in Distributed Query Processing", ACM Computing Surveys, vol. 32 Issue 4, Dec. 2000, 422-469.--, therefor.

In Column 26, Claim 21, Line 33-39, delete "identifying ordering data based on a dimension across a plurality of pieces of the geo-spatial data; ordering, based on the ordering data, the plurality of pieces of the geo-spatial data to obtain ordered geo-spatial data; determining a fad based on the ordered geo-spatial data;".

Signed and Sealed this  
Eleventh Day of June, 2019

Andrei Iancu  
*Director of the United States Patent and Trademark Office*